United States Patent
Bennett

(10) Patent No.: US 6,185,554 B1
(45) Date of Patent: *Feb. 6, 2001

(54) METHODS FOR SEARCHING A KNOWLEDGE BASE

(75) Inventor: Victor A. Bennett, Rockwall County, TX (US)

(73) Assignee: Nodel Corporation, Ipswich, MA (US)

(*) Notice: Under 35 U.S.C. 154(b), the term of this patent shall be extended for 0 days.

This patent is subject to a terminal disclaimer.

(21) Appl. No.: 09/151,573

(22) Filed: Sep. 11, 1998

Related U.S. Application Data

(63) Continuation of application No. 08/794,418, filed on Feb. 5, 1997, now Pat. No. 5,813,001, which is a continuation of application No. 08/141,245, filed on Oct. 22, 1993, now abandoned.

(51) Int. Cl.[7] .................................................. G06F 17/30
(52) U.S. Cl. .................... 707/3; 707/2; 370/911; 706/15
(58) Field of Search ........................... 707/1–6; 706/21, 706/15

(56) References Cited

U.S. PATENT DOCUMENTS 5,813,001 * 9/1998 Bennett .................................... 707/3

* cited by examiner

*Primary Examiner*—Hosain T. Alam
(74) *Attorney, Agent, or Firm*—Locke Liddell & Sapp LLP

(57) ABSTRACT

A method and apparatus is provided for searching a knowledge base to determine whether a search object matches any of a plurality of knowledge base entries. Initially, at least one search object bit is selected and examined to determine whether the knowledge base includes a partially matched entry that represents the same bit pattern in its corresponding bits, and when it does not, the search is terminated indicating no match. When the knowledge base does include a partially matched entry, the group of partially matched entries is identified. Thereafter, at least one previously unselected search object bit is selected and examined to determine whether the group of partially matched entries includes a further matched entry that represents the same bit pattern in its bits that correspond to the previously unselected search object bit and when it does not, the search is terminated indicating no match. When the knowledge base does include a further matched entry, the group of partially matched entries is updated to identify only the further partially matched entries. A determination is then made as to whether each bit of the search object has been selected and when it has, an indication is made of a match for the group of partially matched entries and the search is terminated. When it is determined that each search object bit has not been selected, a new search object bit is selected and the search proceeds in the manner described above.

14 Claims, 10 Drawing Sheets

METHODS FOR SEARCHING A KNOWLEDGE BASE

This is a continuation of application Ser. No. 08/794,418 filed Feb. 5, 1997 entitled Method for Performing Optimized Intelligent Searches of Knowledge Bases Using Submaps Associated with Search Objects, now U.S. Pat. No. 5,813,001 which is a continuation of application Ser. No. 08/141,245 filed Oct. 22, 1993 and entitled Method And Apparatus For Performing A Search, now abandoned.

This invention relates to a method and apparatus for organizing entries in a knowledge base, and for searching the knowledge base to determine whether a search object matches any of the entries.

BACKGROUND OF THE INVENTION

The searching of a knowledge base to determine a match or conflict for a given search object is an important requirement for many different types of applications. For example, the following applications rely heavily on the performance of speedy searches: data base retrieval; expert systems; robotic and state control strategy; signal recognition, including for example speech and image recognition; communications, including for example data compression and protocol processing for bridging, routing and switching applications; natural language cognitive systems; modeling operations; parsers; and compilers. Thus, a great deal of work has been done in an attempt to find better ways of performing searches.

The effectiveness of a searching scheme can be evaluated based upon three separate, but related, characteristics. First, the cost of the scheme in terms of memory required to implement the knowledge base should be minimized. Second, the speed of the searching scheme, as determined by the worst case time required to complete a search, should be maximized. Generally, searching schemes are implemented in a plurality of steps or cycles that each take a predetermined amount of time to complete. Thus, the maximum time to complete a search is generally reduced by minimizing the worst case number of required steps or cycles. Finally, the cost associated with updating the knowledge base to add or delete entries should be minimized. Typically, when a knowledge base is being updated, it cannot simultaneously be used to perform searching. Since the efficiency of any searching scheme is based on the number of searches it can perform in a given amount of time, time spent maintaining the knowledge base should be minimized.

For many applications, searches are performed on search objects having a large number of bits. An example of such an application is a bridge in a communication system. A typical communication system includes a number of devices that communicate over a plurality of connections. Typically, the system is organized into a plurality of local connections with only a limited number of devices being associated with each local connection. A network of bridges is used to interconnect the local connections so that each device can communicate with other devices that are not associated with the same local connection. Each local connection has an associated bridge that monitors traffic on the local connection, as well as external traffic (i.e., traffic on any other connection in the system). When a bridge determines that external traffic is being sourced to a device on its local connection, the bridge allows the information to pass through to the local connection. Similarly, when information is sourced from the local connection to an external destination, the bridge allows the information to pass from the local connection. As a result, the local connection is not congested with external traffic.

Typically, devices communicate by moving packets of information from a source to destination across the system. A packet typically includes bits identifying the addresses, which can be on the order of forty-eight bits, of the packet's source and destination devices. Each bridge monitors traffic locally and externally by maintaining a knowledge base with an entry for each of the devices on its associated local connection. Thus, one function performed by a bridge is to receive externally sourced packets, and perform a search of its knowledge base to determine whether the 48-bit destination address matches any of the devices located on its local connection. Thus, the search object (i.e., the destination address) could have a value equaling any of $2^{48}$ or 280 trillion possible addresses. However, the number of entries in the bridge's knowledge base will be equal only to the number of devices on its associated local connection, and therefore, will be significantly less than 280 trillion.

As seen from the foregoing, to implement the requirements of the bridging application, a searching scheme needs to operate on a search object that can have any of a huge number of possible values, but must search a number of knowledge base entries that is significantly less. This characteristic is typical of many searching applications. However, prior art searching techniques are not particularly well adapted to implement such searches.

An example of a technique for implementing a searching scheme is to use direct memory access. Under such a scheme, a memory is provided that has the capability of storing a number of entries equaling the full set of possible values that the search object could have. Thus, for the example described above, the 48-bit destination address would be used to directly address a knowledge base memory having a 48-bit address. Such a searching scheme would provide extremely fast searching and updating wherein each could be performed in one step or cycle because the 48-bit address could directly access each entry in the memory. However, for applications wherein the search object includes a large number of bits, the cost in memory to support the full set of possible search values may be so large as to make such a searching scheme impractical. For example, to use direct memory access to implement the bridging application described above, the knowledge base memory would need to include 280 trillion (i.e., $2^{48}$) entries. Thus, because of the large amount of memory required, direct memory access is not practical for use in searching applications wherein the search object includes a large number of bits.

Other prior art searching techniques have been developed wherein the size of the knowledge base is bounded by the maximum number of entries stored at one time. Informed searches are an example of such a searching technique. Informed searches are implemented using a plurality of look-ups of the knowledge base memory, with the result of each look-up being used to determine the memory address for the next look-up. A binary search is an example of an informed search. In a binary search system, all of the search entries stored in the knowledge base are sorted by address. To perform a search for a given search object, the object is first compared with the entry stored in the middle of the knowledge base. If the search object does not match the middle entry, an indication is provided as to whether the value of the search object is higher or lower, such that the determination of which entry to compare next is an informed one. The search object is then compared with the entry stored between the middle entry and either the upper or lower entry. In this manner, the searching scheme continues to divide the remaining entries in half until a match or miss is determined.

Binary searching provides an advantage over the direct memory access scheme because the knowledge base need only include sufficient memory to store the worst case number of entries actually being searched at one time, rather than having sufficient memory to store an entry corresponding to every value that the search object could possibly have. However, a performance price is paid for both search speed, and updating the knowledge base to add/delete entries. In a binary search system, the relative position of the entries in the knowledge base is important because that is what enables the search to be informed. Thus, when the knowledge base is updated with an entry having a relatively low value, it is possible that each of the entries in the knowledge base would need to be updated to readjust their positions. Thus, the cost of updating the knowledge base is a function of, and in the worst case is equal to, the number of entries stored. Additionally, the worst case time required to perform a binary search is also greater than that for the direct memory access scheme. Rather than performing every search in one step or cycle, the worst case number of cycles required to perform a binary search is a function of the number N of entries in the knowledge base, and is equal to $\log_2 N$.

In an attempt to increase searching speed, some searching schemes have incorporated hashing techniques wherein the knowledge base entries are stored in hashing tables. Hashing tables use a non one-to-one mapping function in an attempt to improve the probability of finding an early match. However, because non one-to-one mapping is used, more than one search entry can map to a single address, creating a hashing collision. Thus, hashing schemes must include some mechanism for resolving collisions. Since the resolution of hashing collisions generally requires additional lookups, collisions can greatly reduce the speed at which searches of a hashing table can be performed.

In view of the foregoing, it is an object of the present invention to provide an improved method and apparatus for performing searches.

SUMMARY OF THE INVENTION

The foregoing object is achieved in one illustrative embodiment of the invention in which a method and apparatus for searching a knowledge base to determine whether the knowledge base includes an entry that matches a search object is provided, the search object including a plurality of bits, the knowledge base having a plurality of entries that each include a plurality of bits, each bit of each entry corresponding to one of the plurality of search object bits. In accordance with the illustrative embodiment, at least one search object bit is selected, the selected at least one search object bit representing a selected bit pattern. A determination is made as to whether the knowledge base includes at least one partially matched entry by determining whether the knowledge base includes an entry that represents the selected bit pattern in its at least one bit that corresponds to the at least one selected bit of the search object. When it is determined that the knowledge base does not include at least one partially matched entry, an indication of no match for the search object is made and the search is terminated. When it is determined that the knowledge base includes at least one partially matched entry, a group (hereinafter sometimes referred to as a submap) of all partially matched entries is identified. At least one previously unselected search object bit is then selected, the previously unselected at least one search object bit representing a target bit pattern. A determination is made as to whether the group (or submap) of partially matched entries includes at least one further partially matched entry by determining whether the group includes at least one partially matched entry that represents the target bit pattern in its at least one bit that corresponds to the at least one previously unselected bit of the search object. When it is determined that the group of partially matched entries does not include at least one further partially matched entry, an indication of no match for the search object is made and the search is terminated. When it is determined that the group of partially matched entries includes at least one further matched entry, the group of partially matched entries is updated to identify only the further partially matched entries. A determination is made as to whether each bit of the search object has been selected and then it has, an indication is made of a match for the group of partially matched entries and the search is terminated. When it is determined that each search object bit has not been selected, a new search object bit is selected and the search proceeds in the manner described above.

In another illustrative embodiment, a method and apparatus for adding a new entry to the knowledge base of a searching device is provided, the searching device for performing searches to determine whether the knowledge base includes an entry that matches a search object, the searching device having a memory including a plurality of independently addressable memory locations, each memory location having a corresponding address represented by a plurality of address bits that include a plurality of high-order bits and a plurality of low-order bits. In accordance with the illustrative embodiment, the bits of the new entry are separated into at least first and second groups of bits, each group of bits representing a value, the first and second groups of bits of the new entry corresponding to first and second groups of bits of each entry included in the knowledge base. A first bit pattern is written into a first memory location at a first memory address by selecting the first memory address so that at least its low-order bits represent a value equaling the value represented by the first group of bits of the new entry, and by forming the first bit pattern so that it includes at least the high-order bits of an offset address identifying a group of memory locations including at least one previously unused memory location. A second bit pattern is written into a second memory location at a second memory address by selecting the second memory address so that its high-order bits are equal to the offset address stored in the first memory location, and by forming the second bit pattern so that it distinguishes the new entry from previously-added entries having values represented by their corresponding first and second groups of bits that do not equal the values respectively represented by the first and second groups of bits of the new entry.

In a further illustrative embodiment, a method and apparatus is provided for organizing a memory of a searching device that performs searches to determine whether a knowledge base includes an entry that matches a search object, the search object including a number of bits that is less than the number of address bits of the memory, each bit of each entry corresponding to a search object bit. In accordance with the illustrative embodiment, the memory is updated whenever an entry is added or removed from the knowledge base by altering a value stored in at least one memory location. The memory is organized so that when the memory is accessed with an address based at least partially upon the value of at least one search object bit, the value output from the memory determinatively indicates whether or not the at least one search object bit matches its corresponding bit of any knowledge base entry.

In an additional illustrative embodiment, a method is provided for implementing a searching device that performs searches to determine whether a knowledge base includes an entry that matches a search object, the searching device having a memory including a plurality of independently addressable memory locations, the search object including a number of bits that is less than the number of address bits of the memory, each bit of each entry corresponding to a search object bit. In accordance with the illustrative embodiment, a search is performed for a specified search object by reading a plurality of memory locations corresponding to a plurality of read addresses, each read address being based at least partially upon at least one selected bit of the specified search object, the selected bits upon which the plurality of read addresses is based being selected in a predetermined sequence. The memory is updated whenever an entry is added or removed from the knowledge base by altering at least one memory location so that it stores an updated value, and by selecting the updated value and the at least one memory location so that when a search is performed for a selected search object, a value output from the memory during each of the plurality of reads determinatively indicates whether or not at least one bit of the selected search object matches its corresponding bit of any knowledge base entry.

In a further illustrative embodiment, a neural network is provided for performing searches to determine whether the neural network represents an entry that matches a search object, each entry having at least first and second groups of bits respectively corresponding to at least first and second groups of bits of the search object, the first group having a number of bits F and the second group having a number of bits S, each entry having first and second values respectively represented by its first and second groups of bits. In accordance with the illustrative embodiment, the neural network includes a first-level node that compares the value represented by the first group of bits of the search object with the first value of each entry. The first-level node outputs a first-level miss arc that is activated when it is determined that the value represented by the first group of bits of the search object does not equal the first value of any entry. The first-level node further outputs a number of first-level match arcs or submaps, the number of first-level match arcs being equal to a number of distinct first values represented by the knowledge base entries, each first-level match arc (or submap) corresponding to a distinct first value and being activated when it is determined that the first group of bits of the search object equal its corresponding first value. The illustrative neural network further includes a second-level node corresponding to each first-level match arc or submap, each second-level node being triggered when its corresponding first-level match arc is activated. Each second-level node represents a subset of the entries represented by the neural network, the subset of entries represented by a particular second-level node having first values equaling the distinct first value representing by the particular second-level node's corresponding first-level match arc or submap. Each second-level node compares the value represented by the second group of bits of the search object with the second value of each of its represented subset of entries. Each second-level node outputs a second-level miss arc that is activated when the second-level node is triggered and when it is determined that the value represented by the second group of bits of the search object does not equal the second value of any of its represented subset of entries. Each second-level node further outputs at least one second-level match arc or submap that is activated when the second-level node is triggered and when it is determined that the value represented by the second group of bits of the search object equals the second value of at least one of its represented subset of entries.

DETAILED DESCRIPTION

Figure 1:
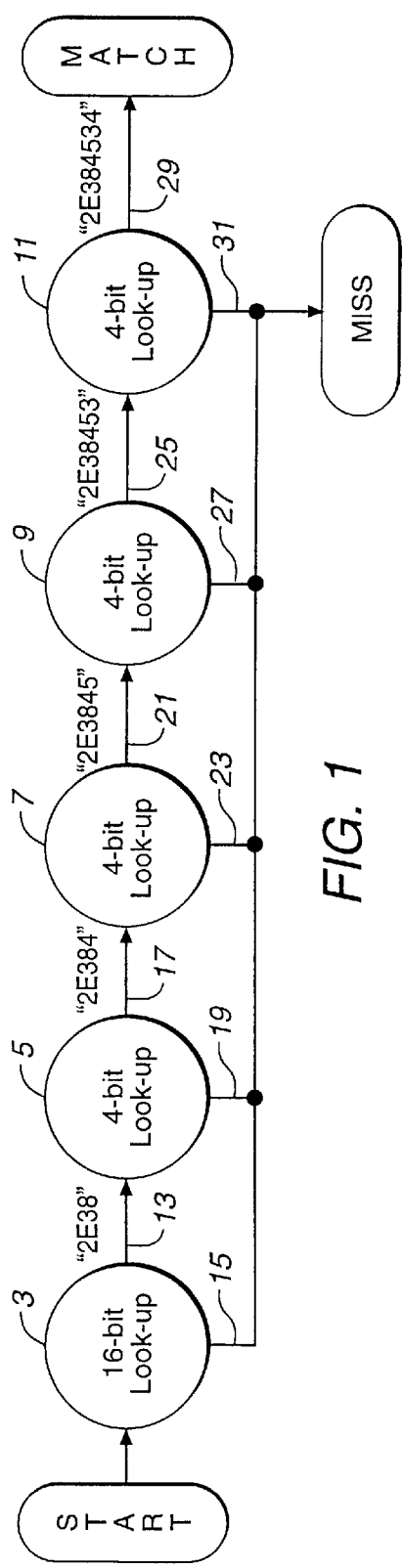
FIG. 1 illustrates the searching scheme of the present invention represented as a neural network.

The present invention is directed to a method and apparatus for performing searches, wherein each search determines a match or conflict between a search object and any of a plurality of entries in a knowledge base. The searching scheme of the present invention functions in many ways like a neural network and therefore, the manner in which it operates is described making reference to the neural network 1 shown in FIG. 1.

The neural network 1 is implemented to determine whether a 32-bit search object matches a predetermined 32-bit entry having a value represented hexadecimally as "2E384534". The neural network 1 includes five nodes, i.e., nodes 3, 5, 7, 9 and 11, each of which outputs two arcs. The first node 3 determines whether there is a match between the most significant sixteen bits of the search object, and the most significant sixteen bits of the neural network entry, i.e., whether bits zero to fifteen of the search object equal "2E38". The node 3 outputs arc 13 which, when activated, indicates that the first sixteen bits of the search object are equal to "2E38", and outputs a second arc 15 indicating a mismatch. Thus, when it is determined at node 3 that the first sixteen bits of the search object do not match those of the neural network entry, arc 15 is activated, thereby terminating the search and indicating that no match was found. However, when it is determined at node 3 that the first sixteen bits do match "2E38", arc 13 is activated, thereby triggering the execution of node 5.

Node 5 determines whether the next four bits of the search object (i.e., bits sixteen to nineteen) are equal to "4", and outputs two arcs 17 and 19 that respectively indicate a match or mismatch. In a similar manner, node 7 determines whether bits twenty to twenty-three of the search object are equal to "5"; node 9 determines whether bits twenty-four to twenty-seven are equal to "3"; and node 11 determines whether bits twenty-eight to thirty-one are equal to "4". Nodes 7, 9 and 11 respectively activate arcs 21, 25 and 29 when they are triggered and a match is determined for their corresponding bits, and activate arcs 23, 27 and 31 when a miss is determined. Thus, if a miss is determined at any of nodes 3, 5, 7, 9, or 11, a corresponding arc is activated to indicate that no match was found and the search is terminated. Arc 29 is activated to indicate a match only when node 11 is triggered, indicating that bits zero to twenty-seven of the search object match "2E38453", and bits twenty-eight to thirty-one of the search object equal "4". Thus, the activation of arc 29 of the neural network 1 indicates that the 32-bit search object matches the sole entry in the network.

Figure 2:
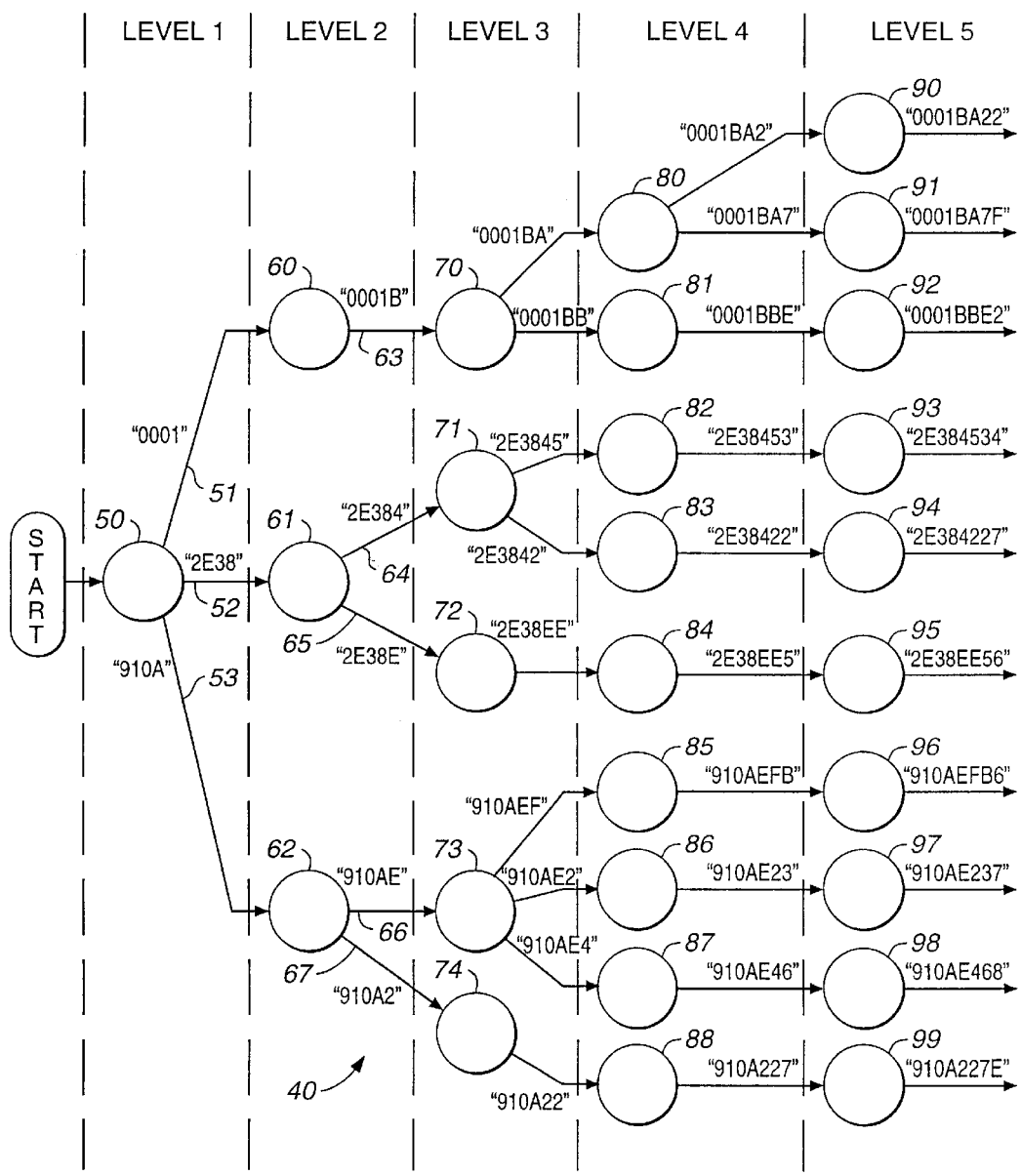
FIG. 2 illustrates the neural network of FIG. 1 expanded to include additional search entries.

As seen from the foregoing, the neural network 1 performs a search for the 32-bit object by dividing the search into five separate steps or levels, wherein each level determines whether a match exists for a subset of the bits of the search object. Nodes 3, 5, 7, 9 and 11 each implement one of the five levels. The benefits of performing a search in separate levels may not be evident from the simple example provided in FIG. 1. Thus, a more complicated example is shown in FIG. 2, wherein a neural network 40 is implemented that is capable of determining whether the search object matches any of ten 32-bit entries having the following hexadecimal values: "0001BA22"; "0001BA7F"; "0001BBE2"; "2E384534"; "2E384227"; "2E38EE56"; "910AEFB6"; "910AE237"; "910AE468"; and "910A227E".

The neural network 40 includes 28 nodes that can be broken down into five levels, i.e., LEVEL1–LEVEL5. LEVEL1 includes a single node 50. Node 50 examines the first sixteen bits of the search object to determine whether they match the first sixteen bits of any of the entries stored in the neural network 40. Although there are ten distinct entries in the neural network 40, many of the entries have the same values over their most significant sixteen bits so that the first sixteen bits of every entry has one of the following three hexadecimal values: "0001", "2E38" or "910A". Therefore, in addition to outputting an arc (not shown) indicating a miss, node 50 outputs only three arcs 51–53. If the first sixteen bits of the search object equal "0001", node 50 activates arc 51 to trigger node 60. Similarly, if the first sixteen bits equal "2E38" or "910A", node 50 respectively activates arcs 52 or 53 to respectively trigger nodes 61 or 62. If it is determined that the first sixteen bits do not match either "0001", "2E38", or "910A", node 50 activates an arc (not shown) indicating that the search object does not match any of the elements stored within the neural network 40, and the search is terminated. Thus, for any search object, node 50 either terminates the search indicating that a miss has occurred, or activates one of arcs 51–53 when the first sixteen bits of the search object match at least one of the neural network entries.

Each of the arcs 51–53 output from node 50 is connected to one of the LEVEL2 nodes, i.e., nodes 60–62. Thus, whenever one of arcs 51–53 is activated, a node in LEVEL2 is triggered to examine the next four bits (i.e., bits sixteen to nineteen) of the search object. Each of the LEVEL2 nodes 60–62 outputs at least one arc that is activated when the node is triggered and a match is found over bits sixteen to nineteen of the search object. Each of the LEVEL2 nodes 60–62 also outputs a miss arc (not shown) that is activated when the node is triggered and no match is found over bits sixteen to nineteen. For example, when triggered, node 60 activates arc 63 when it determines that bits sixteen to nineteen of the search object match "B"; node 61 activates arc 64 when these bits match "4", and activates arc 65 when they match "E"; and node 62 activates arc 66 when these bits match "E", and activates arc 67 when they match "2".

As stated above, for the arcs output from the LEVEL2 nodes 60–62 to be activated, not only must a match occur for bits sixteen to nineteen of the search object, but the corresponding node must have been triggered by an arc output from the LEVEL1 node 50, indicating that the first sixteen bits (i.e., bits zero to fifteen) of the search object also match. Thus, the activation of any of arcs 63–67 from a LEVEL2 node indicates that the first twenty bits of the search object match at least one entry of the neural network 40.

Each of the arcs 63–67 output from LEVEL2 is connected to one of the LEVEL3 nodes 70–74, which examine bits twenty to twenty-three of the search object. When they are triggered and detect a match of these bits, the nodes of LEVEL3 output arcs that activate LEVEL4 nodes 80–88, which examine bits twenty-four to twenty-seven of the search object. Similarly, when the nodes of LEVEL4 are triggered and detect a match of bits twenty-four to twenty-seven, they activate arcs that trigger LEVEL5 nodes 90–99, which examine bits twenty-eight to thirty-one of the search object. When the LEVEL5 nodes are triggered and detect a match for these bits, they activate arcs indicating that the 32-bit search object matches an entry of the neural network 40. Thus, whenever the neural network 40 performs a search, either an output is activated from one of the LEVEL5 nodes 90–99 indicating a match for the 32-bit search object, or a miss output is activated from any of nodes 50, 60–62, 70–74, 80–88 or 90–99, indicating that the search object was not found.

As seen from the foregoing, the neural network 40 of FIG. 2 performs a search of a knowledge base including ten 32-bit entries to determine whether any of the entries matches a 32-bit search object. Two advantageous characteristics of this searching scheme can be seen from FIGS. 1 and 2. First, the maximum number of steps required to complete a search does not vary based upon the number of entries in the knowledge base. As seen from a comparison of FIGS. 1 and 2, although the knowledge base of the neural network 40 (FIG. 2) is ten times larger than the single-entry knowledge base of neural network 1 (FIG. 1), a search of each requires only five steps. Even if a neural network were formed including each of the over four billion possible entries that could be generated from a 32-bit address, a similarly implemented neural network would still include only five levels and therefore, only five steps would be necessary to perform a search for any of the entries. Thus, the maximum number of steps to complete a search using the neural network scheme of the present invention is not dependent on the number of actual entries, but rather is a function of the number of bits of the search object, and the manner in which the network is implemented.

A second advantageous characteristic is that a relatively low performance cost is incurred to update the network when entries are added or removed. As seen from FIG. 2, the search paths to each of the ten entries pass through a node at each of the five levels. Thus, the worst case cost for adding an additional entry would require the addition or updating of five nodes, along with the arcs output therefrom. Similarly, the removal of an entry would at most require the deletion or alteration of five nodes and their corresponding arcs.

As described above, the neural network 40 illustrated in FIG. 2 examines sixteen bits at LEVEL1, and four bits at each of LEVEL2–LEVEL5. It should be understood that the searching scheme of the present invention is not limited to this specific implementation and could be implemented in numerous other ways. For example, each level, including LEVEL1, could examine only four bits. However, if implemented in this manner, four separate levels would be needed to perform the function that is performed by the node 50 shown in FIG. 2. As stated above, the more levels used to implement the neural network, the more steps that are required to perform a search. Thus, if a neural network were implemented so that four bits were examined at each level, the worst case time for performing a search would increase from five to eight steps.

Since performance is generally increased by decreasing the worst case number of steps required to complete a search, it is desirable to maximize the number of bits examined at each level. For example, if sixteen bits were examined at each level, the worst case search for a 32-bit search object would take only two steps. However, increasing the number of bits examined at each level results in an increased cost for implementing the neural network. Generally, the fewer the number of bits examined by a node, the fewer functions the node will need to perform and thus, the less complex the implementation of the node. Therefore, a balance must be struck between implementing the network in a cost effective and simple manner, and maximizing performance.

In the implementation shown in FIG. 2, more bits are compared at the first level (i.e., sixteen bits at LEVEL1) than at any of the subsequent levels. This is advantageous because, as stated above, the more bits that are compared simultaneously, the fewer steps required to complete a search. Additionally, increasing the number of bits compared at the first level does not increase the cost of implementing the network as much as if the number of bits at any other level were increased. As seen from FIGS. 1 and 2, regardless of the number of entries stored in the network, there is only one node at the first level. By contrast, each of the other levels may include a plurality of nodes. Thus, if for example LEVEL2 were implemented to examine sixteen bits in the illustrative network shown in FIG. 2, the three LEVEL2 nodes 60–62 would each be required to examine sixteen rather than four bits. Thus, increasing the number of bits examined at subsequent levels increases the complexity of the neural network by a greater degree than increasing the number of bits compared at the first level.

Although the searching scheme of the present invention is described above as operating first upon the most significant bits of the search object and then progressing sequentially so that the least significant are the last compared, it should be understood that the invention is not so limited. The searching scheme can also be implemented in the reverse order so that the least significant bits are examined first. Additionally, it is not necessary for the bits to be examined in sequential order. All that is required is that each of the bits of the search object be examined at some level of the search scheme.

Although the present invention is described above as comparing either four bits or some multiple thereof at each level, the invention is not so limited. The neural networks described above are broken down into four-bit boundaries merely for illustrative purposes. It should be understood that the number of bits compared at any level can be equal any number, including odd numbers of bits.

The searching technique of the present invention is useful for implementing weighted searches wherein when a miss occurs, it is desirable to know whether a given number of bits matched any entry in the search table. Since the present invention performs an incremental searching of the bits of a search object, information useful for implementing a weighted search can be simply obtained by providing separate miss arcs for failures occurring at different levels. In this manner, the resulting failure arc indicates how many bits of a search object were found to match prior to detecting the first mismatch bit.

As seen from the foregoing description, the searching scheme of the present invention provides a one-to-one mapping correspondence for search objects that are within the range of entries stored by the neural network. However, non one-to-one mapping (i.e., all other addresses map to a miss) is performed for search objects that are outside the range of stored entries. Thus, for the set of possible values of the search object, the present invention performs a one-to-one mapping function from one domain into the range of stored entries, and a non one-to-one mapping function for a second domain having values outside the range.

One technique for implementing the searching method and apparatus of the present invention will be referred to as scattered memory access or SMA. Scattered memory access is an implementation wherein one or more memory accesses perform, for the set of possible values of the search object, the one-to-one mapping function from one domain into the range of stored entries, and the non one-to-one mapping function for the second domain having values outside the range.

Figure 3:
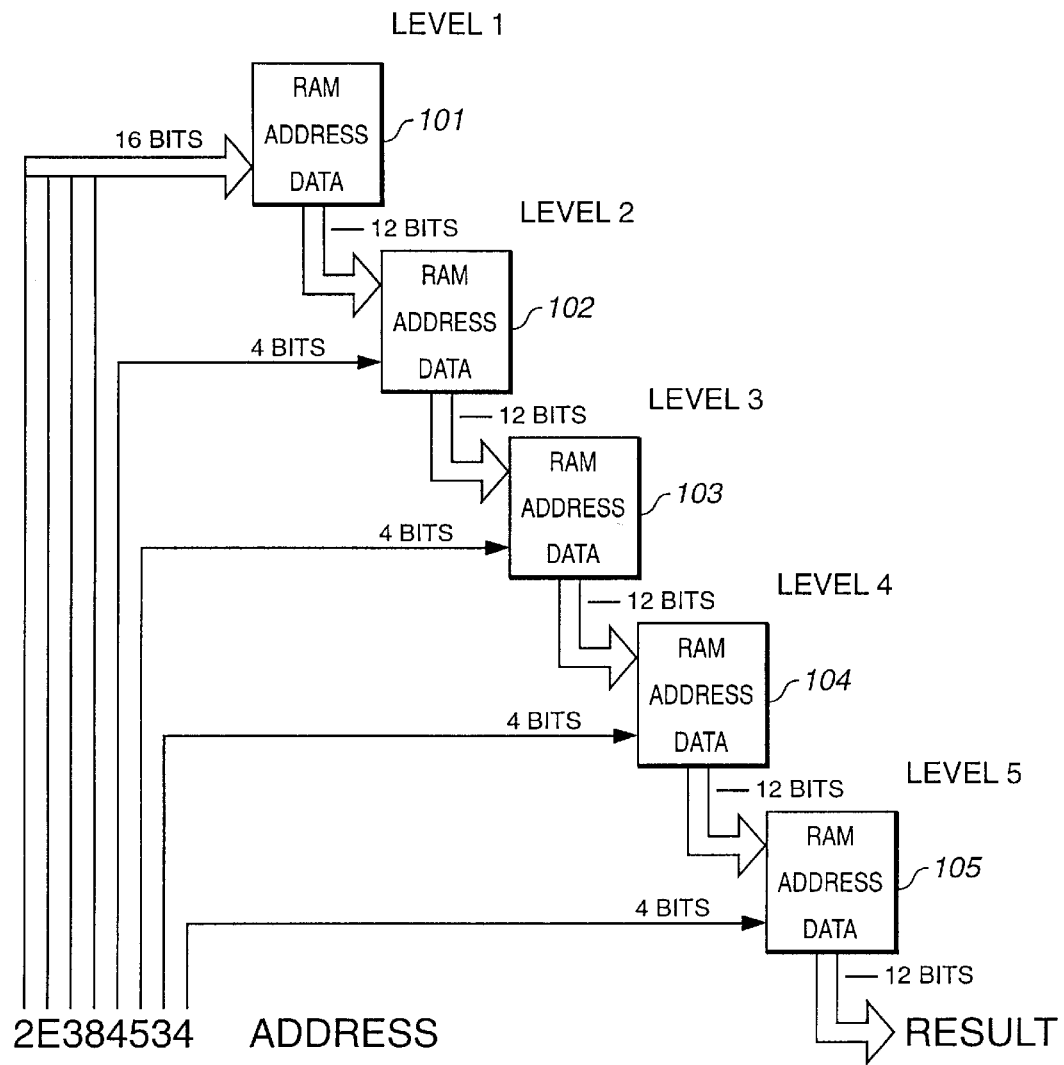
FIG. 3 is a block diagram of one embodiment of the scattered memory access device of the present invention.

In one illustrative embodiment, the scattered memory access device is implemented in the manner shown in FIG. 3. Each of LEVEL1, LEVEL2, LEVEL3, LEVEL4 and LEVEL5 is implemented with a respective RAM 101–105, each RAM having 65,536 locations (addressable with sixteen address bits), and twelve bits of output. The sixteen address bits of LEVEL1 RAM 101 receive the first sixteen bits (i.e., bits zero to fifteen) of the search object. Each of RAMs 102–105 is addressed such that its twelve most significant address bits receive the 12-bit output from the RAM of the preceding level, and its four least significant address bits receive the four bits of the search object to be examined at the corresponding level. In this manner, the 12-bit output from the preceding RAM serves as an offset into the address space of the RAM, and the four search object bits serve as an index into one of sixteen memory locations.

The SMA implementation shown in FIG. 3 provides a searching scheme that can support up to 4095 ($2^{12}$ minus one) unique entries. This maximum number of independent entries can be determined by considering RAMs 102–105 in the last four levels. Each of these RAMs can be considered as implementing 4095 4-bit comparators, wherein the selection of a particular one of the 4095 comparators is determined by the twelve address bits received from the preceding level, and wherein each comparator compares four bits of the search object by performing a look-up of sixteen memory locations. Thus, each sixteen-location block that implements a comparator can be viewed as implementing a neural network node, and the 12-bit RAM output can be viewed as generating 4096 unique arc addresses from each node. Although, the 12-bit output from each of the RAMs 101–105 supports 4096 distinct arc addresses, one arc is assigned to indicate a miss so that a maximum of 4095 independent arcs remain to be assigned to distinct entries. Therefore, the implementation shown in FIG. 3 receives a 32-bit search object and determines whether the search object matches any of up to 4095 distinct 32-bit entries.

A procedure is executed on some facility, such as a processing system, to manage the loading of the RAMs 101–105 when entries are added or deleted to the knowledge base of the device. Each bit of every RAM location can be initialized to contain a single value, such as "0", which can be conveniently selected to indicate a miss. Following initialization, the memory management procedure begins updating the system with values relating to the 32-bit search entries. As an example, the first entry added might have a value "2E384534". As stated above, RAM 101 is used to implement LEVEL1 which includes a single node that examines the first sixteen bits of the search object to determine whether they match the first sixteen bits of any of the search device entries. This determination is made by inputting the first sixteen bits of the search object directly into RAM 101 so that a look-up is performed to determine whether the searching device has an entry whose first sixteen bits match those of the search object.

To add the entry "2E384534", RAM 101 is updated at address "2E38" to have a value indicating that the searching mechanism includes at least one entry whose first sixteen bits equal "2E38". To implement the LEVEL1 node, the 12-bit contents of RAM 101 at address "2E38" is updated to indicate an arc address to a LEVEL2 node implemented in RAM 102. As stated above, RAM 102 can be considered as implementing $2^{12}$ (i.e., 4096) nodes or 4-bit comparators. For the sake of convenience, the node at RAM 102 addresses "000X" is assigned to indicate that a miss has occurred over the first sixteen bits of the search object. Therefore, if "2E384534" were the only entry added to the device and a search is performed for a search object whose first sixteen bits do not equal "2E38", the 12-bit output of RAM 101 would be at its initialized state of "000", thereby indicating a miss. Thus, regardless of the value input to the four low order address bits of RAM 102 (corresponding to bits sixteen to nineteen of the search object), the sourcing of "000" to the twelve high order bits causes RAM 102 to also output "000", indicating a miss for the search object. The low order sixteen locations "000x" for each of RAMs 103–105 are similarly assigned to implement a miss node and each outputs "000" when addressed. As a result, whenever a miss is detected at any level, the address "000X" will propagate through each of the RAMs so that RAM 105 will output "000", indicating a miss.

As seen from the foregoing, it is convenient to reserve arc address "000" for each of memories 102–105 to indicate a miss. Thus, when updating RAM 101 to add entry "2E384534", the 12-bit contents of the memory location at address "2E38" is assigned an arc address value other than "000". For example, the 12-bit output can be assigned a value of "001" so that the arc address "001" between LEVEL1 and LEVEL2 indicates that the first sixteen bits of a search object are equal to "2E38".

As a result of updating LEVEL1 RAM 101 in the manner described above, the sixteen locations of RAM 102 at addresses "001x" are assigned to implement a LEVEL2 node or 4-bit comparator for entries whose first sixteen bits equal "2E38". Thus, to update RAM 102 to add entry "2E384534", one of the sixteen locations at addresses "001X" must be updated to indicate a match for this entry.

As stated above, the four low order bits of RAM 102 receive bits sixteen to nineteen of the search object, which, for an object matching entry "2E384534", will equal "4". Thus, to add entry "2E384534", RAM 102 is updated at address "0014"; the first twelve bits equal "001" to correspond to the arc address output from RAM 101, and the last four bits equal "4" to correspond to the value of bits sixteen to nineteen of entry "2E384534". The 12-bit contents of RAM 102 at address "0014" are updated to provide an offset arc address into RAM 103 of LEVEL3, in much the same manner in which RAM 101 was updated to provide an offset into RAM 102. Thus, the 12-bit value of RAM 102 at location "0014" can similarly be updated to equal "001". In this manner, an arc having an address of "001" extending between LEVEL2 and LEVEL3 indicates that the first twenty bits of the entry are equal to "2E384".

The updating of the SMA device to add entry "2E384534" can be concluded by adding an entry to each of RAMs 103–105 in a similar fashion. Thus, the value "001" is written to RAM 103 at address "0015"; to RAM 104 at address "0013"; and to RAM 105 at address "0014". In this manner, nodes are formed at each of LEVEL1–LEVEL5 at addresses "001X" of the corresponding RAMs 101–105. As stated above, each of these nodes can be considered as implementing a 4-bit comparator that compares four bits of the search object with four bits of the stored entry to determine a match. Whenever a mismatch is found at any of LEVEL1–LEVEL5, the corresponding RAM 101–105 produces "000" on its output. As stated above, since the sixteen locations "000x" of each of RAMs 102–15 have values of "000", an output of "000" from any of RAMs 101–105 propagates through to the last RAM output, thereby indicating that the search object is not stored in the scattered memory access device.

Additional entries are added to the scattered memory access device in a similar fashion. For example, a second entry can be added having a value of "A79C2FBO". When such a new entry is added, RAM 101 is updated at address "A79C" so that its 12-bit contents include an arc address to form an independent LEVEL2 node in RAM 102. As stated above, addresses "000X" and "001X" in RAM 102 were previously respectively assigned to implement a miss node, and a node for value "2E38". Thus, to add entry "A79C2FBO", the 12-bit contents of RAM 102 at address "A79C" can be updated to have any value other than "000" or "001". For example, the 12-bit contents of RAM 101 at address "A79C" can be assigned the value "002". Similarly, the remainder of the SMA RAMs can be updated such that the value "002" is stored to RAM 102 at address "0022"; to RAM 103 at address "002F"; to RAM 104 at address "002B"; and to RAM 105 at address "0020". In this manner, distinct nodes that perform 4-bit compares are formed at each of LEVEL2–LEVEL5 for entry "A79C2FBO". No additional node is formed at LEVEL1 which still performs a compare of the first sixteen bits of the search object. However, an additional arc is formed in the LEVEL1 RAM 101 at address "A79C", indicating that the device includes at least one entry whose first sixteen bits are equal to "A79C".

In the example described above, each of the arcs extending between the RAMs 101–105 are assigned to address "001" for entry "2E384534", and are assigned to address "002" for entry "A79C2FBO". However, it is not necessary that, for any given entry, the arcs between levels maintain the same address. In fact, for certain combinations of entries, it is not desirable to identically assign each of the arc addresses for a particular entry. For example, if the third entry added to the SMA device shown in FIG. 3 had a value of "2E384789" advantages are obtained by not assigning each of the arcs for the third entry to have the same address. When this third entry is added to the device, RAMs 101 and 102 need not be updated because RAM 103 already has a node at addresses "001X" that is accessed, via arc "001" output from address "2E38" of RAM 101 and arc "001" output from address "0014" of RAM 102, when the first twenty bits of the search object equal "2E384". Thus, when the third entry "2E384789" is added to the SMA device, only RAMs 103–105 need to be updated to form additional arcs and nodes. The next sixteen-location blocks in RAMs 104–105 available to implement a node for the third entry are at addresses "003x". Thus, the SMA device can be updated with a third entry having the value "2E384789" by writing the value "003" to RAM 103 at address "0017"; to RAM 104 at address "0038"; and to RAM 105 at address "0039". Thus, the arcs for entry "2E384789" do not have the same arc address values between each of the levels because from LEVEL1–LEVEL3 the arc addresses equal "001", and from LEVEL3–LEVEL5 the arc addresses-equal "003".

The above-described manner in which the arc addresses are assigned is provided merely for illustrative purposes and it should be understood that when the SMA device is updated with new entries, the arc address values can be updated in a number of different ways. It is not necessary that the arc address values increase sequentially as new entries are added, and it is not necessary that each node or 4-bit comparator added be assigned to memory locations that are contiguous with previously added nodes. Rather, all that is required is that each time a new entry is added, the RAMs 101–105 be updated so that additional nodes or 4-bit comparators are assigned, as necessary, to available memory space so that the device will indicate a match for a search object having a value that matches the entry being added.

It should be further understood that the memory need not be initialized to all zeros, and that zeros need not be the data pattern used to indicate a miss. Rather, all that is necessary is that each of the RAMs be initialized so that when a miss is detected at any level, some path of addresses necessarily propagates through each of the RAMs so that the twelve bits output from RAM 105 is recognized as indicating that a miss occurred. Thus, it is not necessary that the 12-bit arc address stored within the miss locations for each RAM be identical.

As seen from FIG. 3, the LEVEL5 RAM 105 produces a 12-bit output. Since LEVEL5 is the last level in the illustrative embodiment shown in FIG. 3, its output does not indicate an arc address to a subsequent node. Rather, this 12-bit output provides an index indicating which, if any, of the possible 4095 entries has matched the search object. In many searching applications, when it is determined that the search object matched one of the entries of the knowledge base, it is desirable to output certain information pertaining to the matched entry. Thus, the 12-bit output from the last level provides an index to identify which of the entries has been matched.

As seen from the foregoing description, each of the RAMs 102–105 implements a maximum of 4095 nodes or 4-bit comparators. This maximum number is established by the fact that there are twelve address bits ($2^{12}$=4096) input to each of the RAMs to serve as an offset identifying sixteen-location blocks for implementing the nodes, and one of the 4096 nodes is used to indicate a miss. Thus, the maximum number of distinct entries supported is a factor in determining the number of bits output from each of RAMs 101–105. Since the SMA device shown in FIG. 3 supports 4096 distinct entries, it is possible that 4096 arcs, including the miss arc, could be output from any node at any of LEVEL1–LEVEL5. Thus, each of the RAMs 101–105 outputs twelve bits so that it can support 4096 distinct arc addresses.

It should be appreciated from the foregoing that the total memory size used to implement the scattered memory access device is bounded by the number of entries stored within the device, rather than by the maximum number of distinct values that could occur for a search object having a given number of bits. In the example shown in FIG. 3, the search object includes thirty-two bits, such that the entries stored within the SMA device could have any of over four billion unique values. However, as stated above, in a practical application, the number of entries stored at any one time is generally significantly less than the total number of unique values. By limiting the maximum supportable number of entries to 4095, the amount of memory used to implement the SMA device is kept to a reasonable limit. In the implementation shown in FIG. 3, five RAMs are used, each supporting $2^{16}$ or 65,536 addressable locations. Thus, the total number of addressable locations used to implement the device shown in FIG. 3 is 327,680 (i.e., 5×65,536). Each of the addressable locations includes twelve bits or 1.5 bytes of memory, so that the total number of bytes used to implement the device shown in FIG. 3 is only 458,752 (i.e., 327,680×1.5).

The scattered memory access device of the present invention is not limited to supporting only 4095 unique addresses and can support smaller or larger numbers of entries by modifying the illustrative implementation shown in FIG. 3. Generally, the larger the maximum number of entries supported, the more memory required. For example, if the maximum number of distinct entries were doubled and the device were implemented in a manner similar to that shown in FIG. 3, the amount of memory required would approximately double. To support 8191 (i.e., 4096×2, minus 1 miss entry) unique entries, the number of locations in the LEVEL1 RAM need not increase beyond 65,536 (i.e., $2^{16}$). However, the number of bits of each location in the LEVEL1 RAM would increase from twelve to thirteen to support 8192 (i.e., $2^{13}$) unique arc addresses. Additionally, the number of bits for each entry in the RAMs for LEVEL2–LEVEL5 would also increase to thirteen for the same reason. Furthermore, the number of locations in each of the RAMs for LEVEL2–LEVEL5 would be doubled in order to support 8192 (i.e., $2^{13}$ unique nodes or 4-bit comparators. Thus, the SMA device would include one RAM of 65,536 locations, and four RAMs each having 131,072 (i.e., $2^{17}$) locations for a total of 589,824 memory locations. As stated above, each of the memory locations would include thirteen bits or 1.625 bytes. Thus, the total memory required for the device would be 958,464 bytes (i.e., 589,824 locations×1.625 bytes per location). Thus, for this particular implementation, doubling the maximum number of supported entries increases the number of locations by 1.8 times, and the number of bytes by 2.089 times.

As seen from the foregoing, the amount of memory required to implement the scattered memory access device for a given maximum number of distinct entries is dependent on three factors, i.e., the number of entries, the number of memory locations required per entry, and the number of bits required per location. As is fully described below in connection with FIG. 10, the worst case number of memory locations per entry is dependent not only upon the number of levels of the device, but also upon the worst case ratio of unused to used locations.

It should be understood that a procedure should be executed on some facility, such as a processing system, to manage arc address assignments and the loading of the RAMs 101–105. Existing memory management techniques in use for managing the allocation of disk space and other memory resources in processing systems and other applications are suitable for handling the arc address assignment and loading of the scattered memory access RAMs. As stated above, the RAMs need not be loaded in any particular fashion. Rather, all that is required is that each time an entry is added to the device, the RAMs be updated to form nodes and create arc assignments so that the device will indicate a match when a search object is provided having the same value as the added entry. Thus, for each additional node created, all that is required is that vacant memory locations in the relevant RAMs be found for the new node, and that the preceding memory be updated with an arc address having a value that provides the proper offset into the memory locations assigned to the newly added node.

An advantageous feature of the SMA device is the minimal cost required to update the device when a new entry is added or deleted. In the illustrative embodiment shown in FIG. 3, the worst case cost for updating an entry is incurred when five new nodes and arcs need to be formed for an entry. Thus, the worst case cost for updating the device includes five memory writes, one to each of RAMs 101–105. The device does not need any major reconstruction to add, delete or alter entries. The worst case cost is determined solely by the number of levels in the device, and does not increase based on the number of entries stored. Removing an entry merely requires that the RAMs be written to indicate a miss for a search object having a value equaling that of the removed entry. Again, the worst case cost for removing an entry would involve five memory writes, one to each of RAMs 101–105 to introduce zeros into the memory locations that previously stored unique arc addresses for the removed entry. Thus, updating the scattered memory access device shown in FIG. 3 merely requires, at worst, five memory writes for each newly added or removed entry.

It should be understood that the specific implementation shown in FIG. 3 is provided merely for illustrative purposes. The scattered memory access device of the present invention can be similarly implemented to perform searches on search objects having any bit length, and the device is not constrained to searching 32-bit objects. Additionally, although the device is implemented to compare sixteen bits at LEVEL1 and four bits at each succeeding level, numerous other implementations are also possible. For example, additional levels can be created by comparing only four bits at each level, rather than comparing sixteen bits at LEVEL1 as is done in the embodiment shown in FIG. 3. Conversely, the number of levels can be reduced by comparing greater than four bits at any of the later levels. It should also be recognized that the number of bits compared at each of the levels subsequent to LEVEL1 need not be identical and can be varied in any fashion. Furthermore, the number of bits compared at each level is not constrained to being an even number. The scattered memory access device can be implemented in many different configurations. All that is required is that each bit of the search object be compared at one of the device levels.

The factors that are important in determining the manner in which the SMA device should best be implemented for a given application are speed of searching and updating, as well as memory consumption. The more bits that are compared simultaneously at each level, the quicker the worst case search will be. For example, if SMA device for searching 32-bit objects were implemented in two levels, each comparing sixteen bits, the search would be performed in two levels and would require only two memory accesses. However, if implemented in this manner, more memory would be required because LEVEL2 would require the implementation of 4096 16-bit comparators. Conversely, if fewer bits were compared at each level, a reduction in memory consumption could be realized, but at the cost of increasing the number of levels and consequently, the time required to perform a search. Thus, the specific manner in which the SMA device should be implemented is dependent upon a balancing of the above-described criteria for any particular application.

Figure 4:
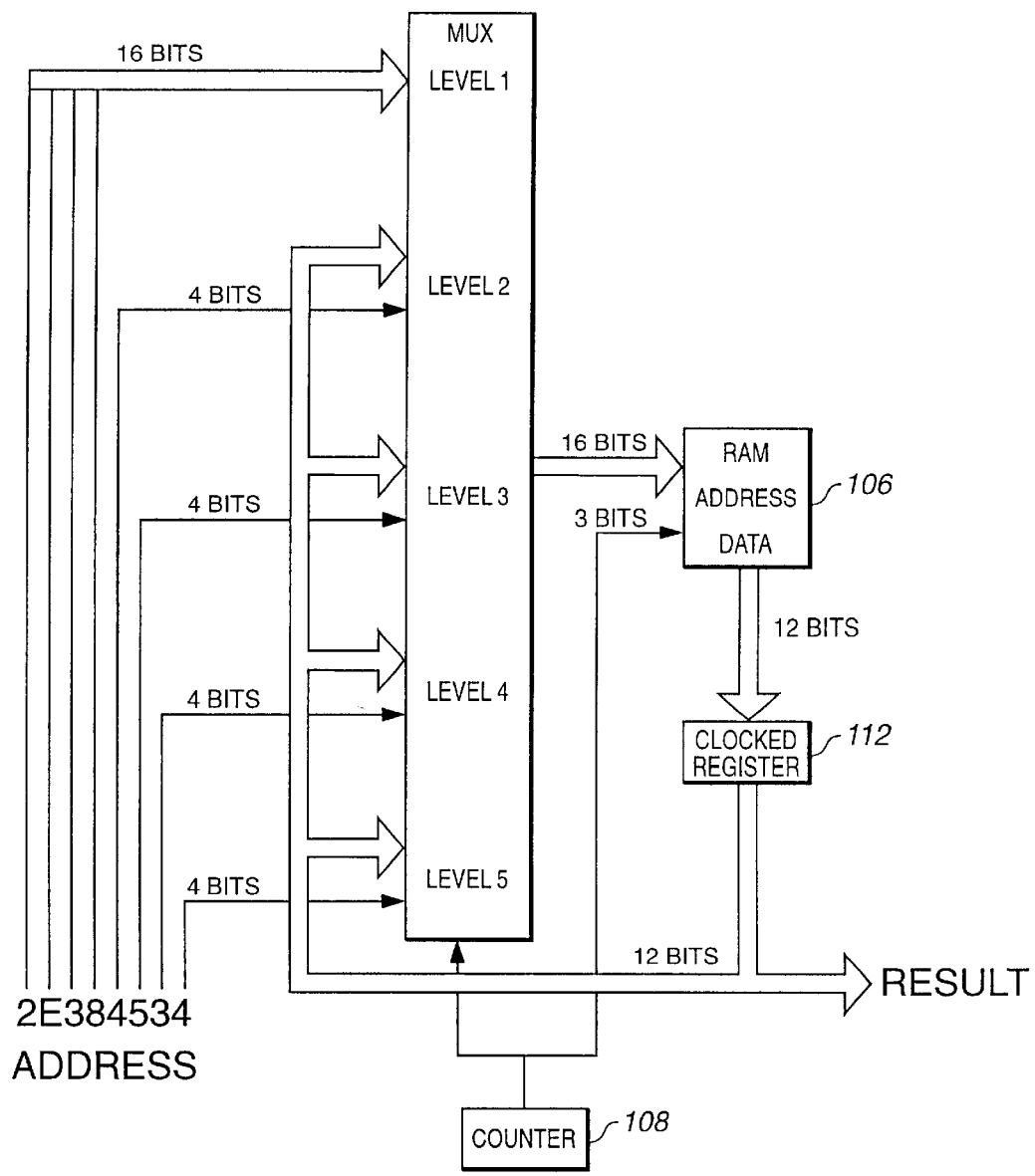
FIG. 4 is a block diagram of a second embodiment of the scattered memory access.

An alternate embodiment of an SMA device that performs a search for a 32-bit search object and supports 4095 unique entries is provided in FIG. 4. The embodiment of FIG. 4 is similar in many respects to the embodiment of FIG. 3. The device is separated into five levels, wherein LEVEL1 examines the first sixteen bits of the search object, and each of the remaining levels examines four bits. However, a single RAM 106 replaces RAMs 101–105 of the FIG. 3 embodiment. The RAM 106 can be divided into five pages, wherein page one implements the function of the RAM 101 in FIG. 3, page two implements the function of the RAM 102, etc. A counter 108 provides three high-order address bits to the RAM 106 to select which of the pages is active. Thus, the RAM 106 is eight times larger than each of the RAMs 101–105 shown in FIG. 3; although RAM 106 need only be five times larger to duplicate the number of memory locations used in the FIG. 3 embodiment, the necessity for using three bits to distinguish between the five pages requires that eight ($2^3$) unique pages be used. The division of the RAM 106 into distinct pages corresponding to RAMs 101–105 simplifies the memory management requirements for updating the RAM 106, and allows the memory to be managed in much the same way as in the embodiment of FIG. 3.

The implementation shown in FIG. 4 also includes a five-entry 16-bit multiplexer (mux) 110. The mux 110 receives, the 3-bit output from the counter 108 indicating which page of memory is being accessed, and selects the corresponding bits of input from the search object and from a clocked register 112 provided on the output of RAM 106. A search using the scattered memory access device of FIG. 4 requires five clock cycles. In the first cycle, the counter 108 is initialized to select LEVEL1 so that the mux 110 passes the high order sixteen bits of the search object to the address of RAM 106. The RAM 106 responds by outputting a 12-bit arc address to a LEVEL2 node in the manner described above in connection with the FIG. 3 embodiment. At the end of the clock cycle, this 12-bit arc address is clocked into the register 112, and the counter 108 is incremented. Thus, during the second cycle, the mux selects the LEVEL2 arc address stored in the register 112, as well as bits sixteen to nineteen of the search object and sources these bits the address of RAM 106. Therefore, in the second cycle, the RAM 106 performs the same function that was performed by the RAM 102 in the FIG. 3 embodiment. In this manner, by incrementing the counter such that the mux 110 and RAM 106 simultaneously step through each of LEVEL1–LEVEL5, the search of the 32-bit search object is performed in five cycles.

Figure 5:
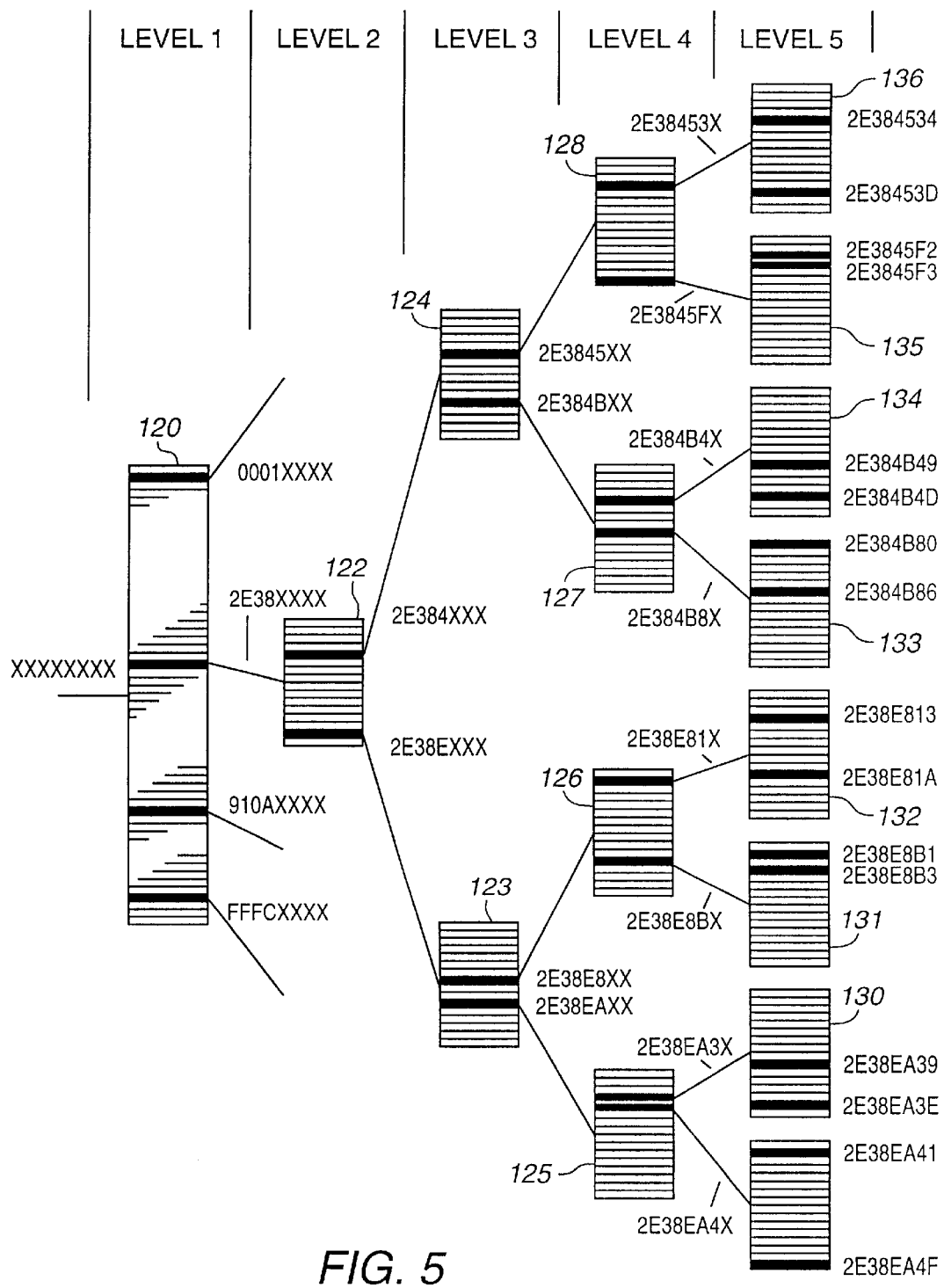
FIG. 5 illustrates the distribution of memory locations throughout one embodiment of the scattered memory access device wherein only sixteen-entry tables are used.

The above-described embodiments of the scattered memory access device of the present invention provide a quick and cost-effective scheme for implementing searches. However, in other embodiments, steps are taken to further improve the efficiency of the scattered memory access device. Inefficiency in the SMA device comes from unused memory locations, i.e., those memory locations filled with misses. This inefficiency is shown conceptually in FIG. 5 which illustrates the distribution of several nodes throughout an illustrative embodiment of the scattered memory access device. In FIG. 5, a block of $2^{16}$ (i.e., 65,536) memory locations 120 is shown in LEVEL1 as storing four entries corresponding to addresses "0001xxxx", "2E38xxxx", "910Axxxx", and "FFFCxxxx". Similarly, a block of sixteen memory locations 122 at LEVEL2 includes only two used locations corresponding to addresses "2E384xxx" and "2E38Exxx". As seen from FIG. 5, additional sixteen-location memory blocks 123–136 are dispersed throughout LEVEL3, LEVEL4 and LEVEL5, each block having several unused locations. The memory is used most inefficiently when only one entry out of a large block of locations is used. In the illustrative embodiment shown in FIG. 5, the most inefficient use is when only one entry out of a 16-location block is used, creating a ratio of 15/1 unused to used locations. In alternate embodiments of the SMA device of the present invention, a mapping ability is provided to reduce memory consumption and improve the efficiency of memory usage.

Figure 6:
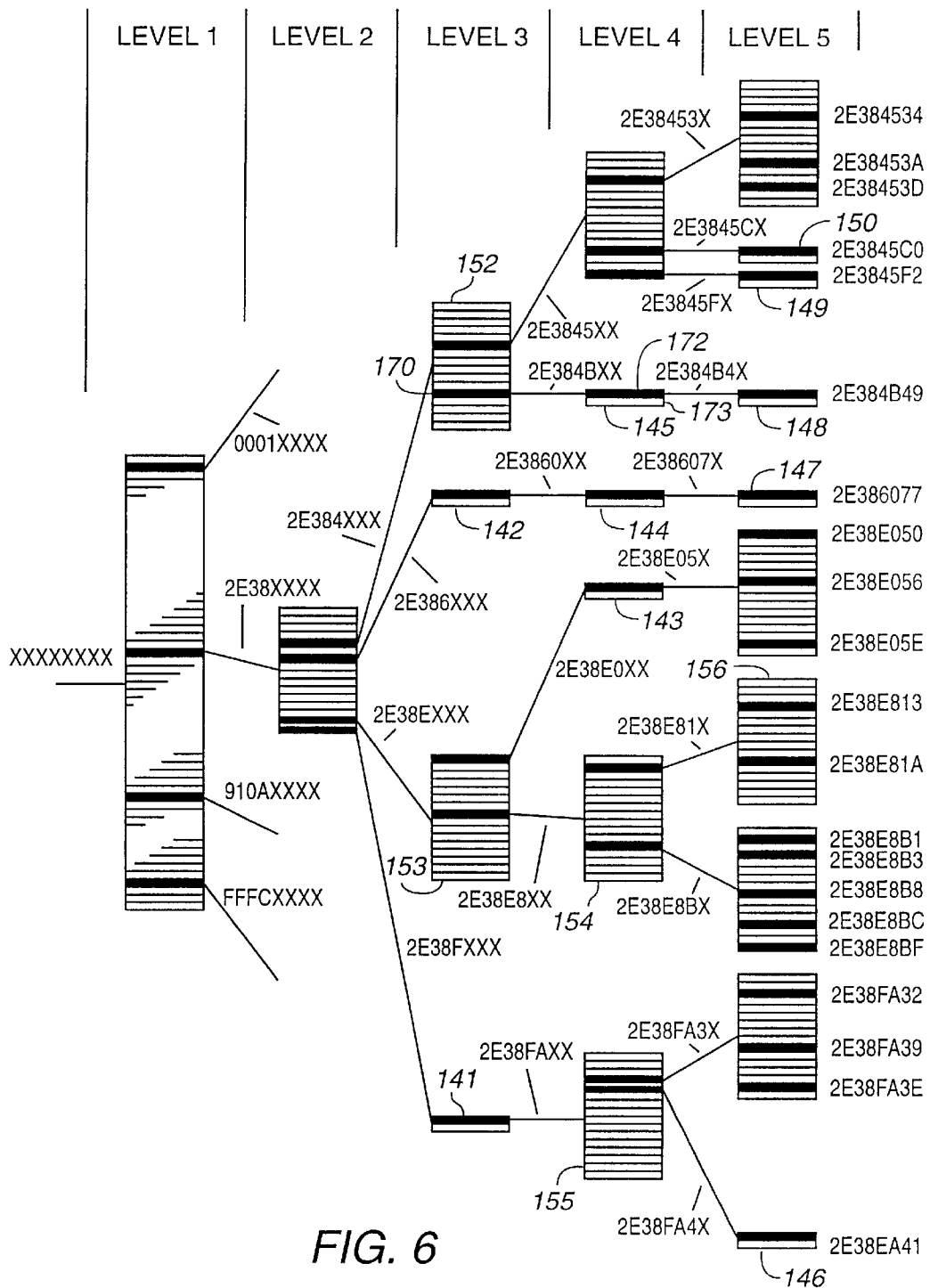
FIG. 6 illustrates the distribution of memory locations throughout an embodiment of the scattered memory access device wherein two and sixteen entry tables are used.

FIG. 6 conceptually illustrates a more efficient scheme for distributing nodes throughout the memory of a scattered memory access device. In the embodiment shown, two-entry tables are used to implement each of the nodes having only one non-miss arc emanating therefrom, i.e., nodes 141–150. Thus, rather than employing a sixteen-entry table with fifteen unused (i.e., miss) locations for each of these nodes, smaller two-entry tables or nodes are utilized, thereby decreasing the total number of required memory locations. In the two-entry tables, one entry stores the non-miss arc address to the node at the next level, and the other stores a miss address.

The use of two-entry tables increases the efficiency of memory usage in the scattered memory access device. When the SMA device is implemented using the scheme shown in FIG. 6, the memory is used least efficiently for notes wherein only two entries of a sixteen-location block are used, such as nodes 152 and 154. Thus, the worst case ratio of unused to used locations is reduced from 15/1 for the implementation shown in FIG. 5, 7/1 (i.e., 14/2) for the implementation shown in FIG. 6. As stated above, reducing the worst case ratio of unused to used locations results in a reduction of the total amount of memory required to implement an SMA device to support a given number of entries.

Figure 7:
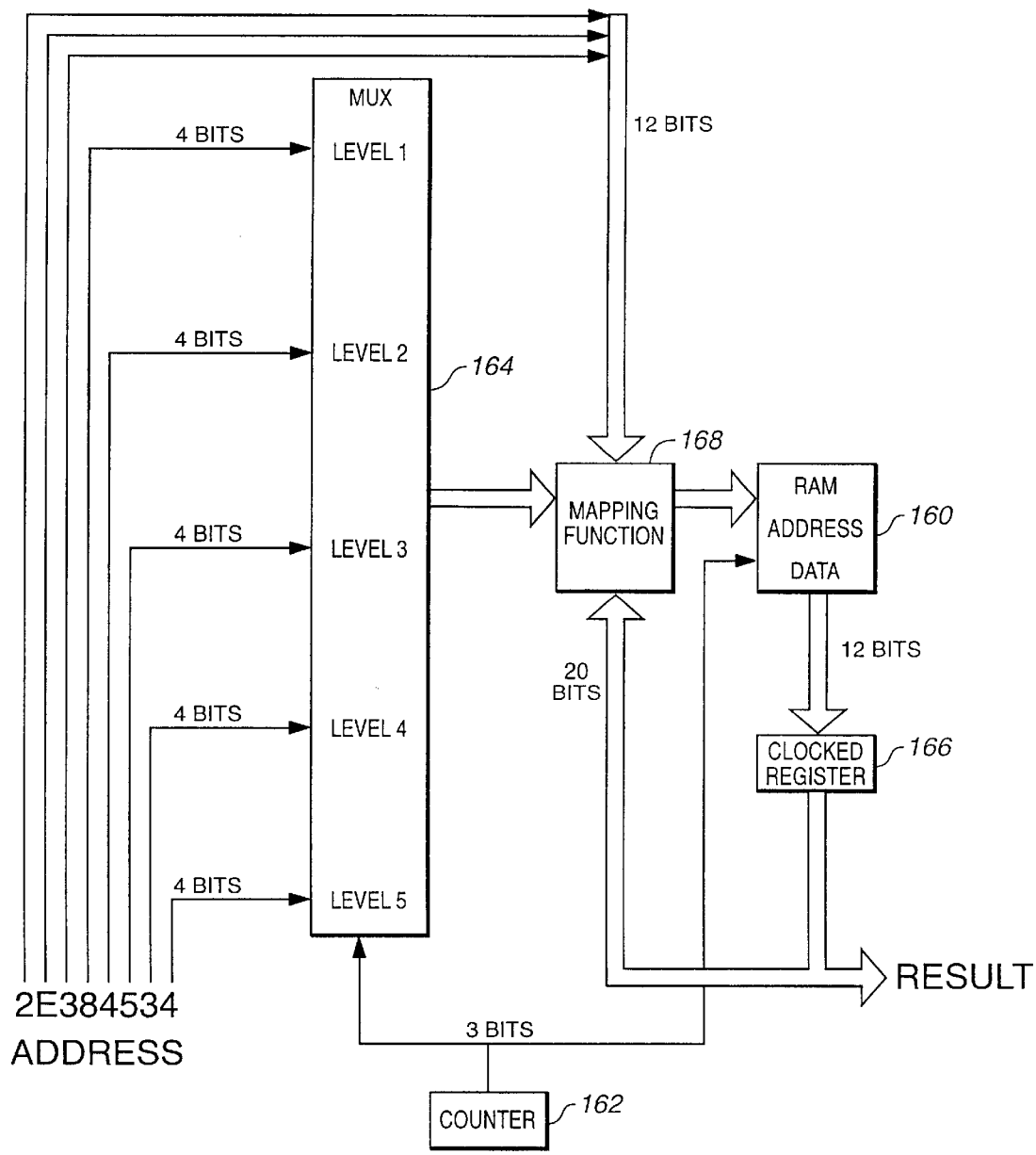
FIG. 7 is a block diagram of a third embodiment of the scattered memory access device wherein a mapping function is implemented.

FIG. 7 is a block diagram of an embodiment of the scattered memory access device that is capable of implementing two-entry tables, as well as additional functions described below. The embodiment shown in FIG. 7 is similar in many respects to that shown in FIG. 4. A single RAM 160 is divided into five pages, each page implementing one of LEVEL1–LEVEL5. A counter 162 provides three high-order address bits to RAM 160 to select which of the pages is active. A five-input 4-bit multiplexer (mux) 164 receives the 3-bit output from the counter 162 indicating which page of memory is being accessed, and selects the corresponding bits of input from the search object. A clocked register 166 is provided at the output of the RAM 160 and stores the outputs of the RAM at the end of each clock cycle. Thus, like the embodiment shown in FIG. 4, a search of the scattered memory access device of FIG. 7 requires five clock cycles, one cycle each to step through LEVEL1–LEVEL5.

The embodiment shown in FIG. 7 includes a mapping function 168 that receives bits zero to fifteen of the search object, the 4-bit output of MUX 164, and the output of the clocked register 166, and maps these values to an address for RAM 160. The mapping function 168 implements two-entry tables by performing, among other functions, a 4-bit compare of the four bits of the search object with the corresponding bits of the non-miss entry, and by mapping the address to the proper entry of a two-entry table based on the results of the compare.

To support the mapping function 168, the number of bits output from the RAM 160 is increased to twenty. Four bits are added so that each arc triggering a two-entry node includes four bits of the entry's address against which the relevant bits of the search object can be compared by the mapping function 168. For example, consider the LEVEL4 two-entry node 145 (FIG. 6), which represents node "2E384B4X". This node is triggered by an arc generated by memory location 170 in LEVEL3. Thus, any search object for which bits zero to twenty-three equal "2E384B" will be mapped to a miss unless bits twenty-four to twenty-seven also equal "4". The mapping function 168 performs the 4-bit compare for a two-entry node such as node 145 to determine whether bits twenty-four to twenty-seven of the search object match the non-miss entry. To enable the mapping function 168 to perform the 4-bit compare at LEVEL4, memory location 170 (which implements the LEVEL3 node that triggers the two-entry node) includes four bits of output that are equal to "4". When the SMA device is in the fourth cycle of comparing a search object that has been found to have an address equaling "2E384BXX", mux 164 passes bits twenty-four to twenty-seven of the search object to the mapping function 168. The mapping function 168 also receives, via the clocked register 166, the four bits from memory location 170 that have the value "4" against which bits twenty-four to twenty-seven of the search object are to be compared. Thus, the mapping function 168 performs a 4-bit compare against these bits and when the search object bits are equal to "4", outputs the address at which memory location 172 is stored, indicating that the node "2E384B4X" is found in the SMA device. Conversely, if bits twenty-four to twenty-seven of the search object are not equal to "4", the mapping function 168 outputs the address of memory location 173, thereby indicating that a miss has occurred. Thus, the mapping function 168 enables node 145 to be implemented using only two memory locations 172 and 173, rather than the full sixteen memory locations that would be used in the implementation shown in FIG. 4.

Figure 8:
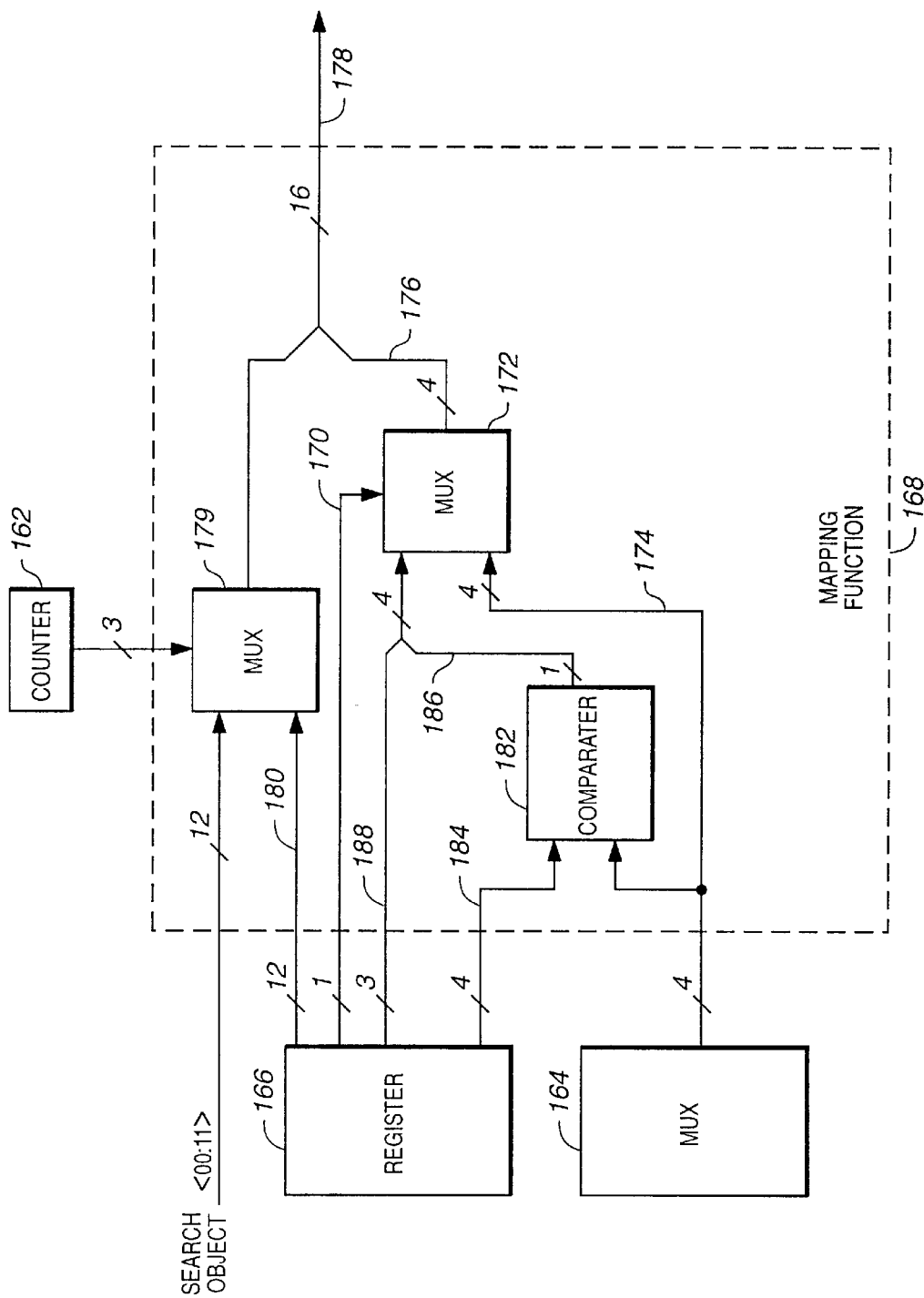
FIG. 8 is a block diagram of one illustrative implementation of the mapping function of FIG. 7.

The mapping function 168 can be implemented in a number of different ways using standard logic devices. An exemplary implementation is shown in FIG. 8. The mapping function 168 receives twenty bits from the clocked register 166, four bits from the mux 164, bits zero to fifteen of the search object, and the 3-bit output of counter 162. The twenty bits received from the register 166 are distributed as follows: twelve bits of arc address 180 that provide a high-order offset for the address at which the next node is stored (these address bits serve the same function as the twelve bits output from the clock register 112 in the embodiment shown in FIG. 4); one control bit 170 that is used to specify whether the next node is implemented with a two or sixteen-entry table; four bits 184 against which the bits of the search object are to be compared when the next node includes only two entries; and three bits 188 that supply intermediate bits of an offset address to the next node when that node includes only two entries.

In contrast to the 16-bit mux 110 used in the embodiment shown in FIG. 4, the mux 164 in the FIG. 7 embodiment is only four bits wide. Thus, the twelve high order bits of the search object and the twelve-bit arc address 180 output from the register 166 are each input directly to the mapping function 168. The mapping function includes a 12-bit mux 179 that selects between these two 12-bit inputs. The output of mux 179 is controlled by the 3-bit output of counter 162. When the counter indicates that LEVEL1 is being processed, the mux 179 selects and passes bits zero to fifteen of the search object. However, when the counter 162 indicates that any of LEVEL2–LEVEL5 is being processed, the mux 179 passes and selects the twelve-bit arc address 180 output from register 166. In this manner, the mux 179 performs the same function as the high order twelve bits of the mux 110 used in the FIG. 4 embodiment. The 12-bit output of mux 179 provides the twelve high order bits of the mapping function output 178.

The control bit 170 is coupled to the select input of a 4-bit mux 172. When the control bit 170 indicates that the next node is not implemented with a two-entry table, the mux 172 selects and passes the four bits of the search object 174 output from mux 164. The 4-bit output 176 of mux 172 provides the four low order bits of the mapping function output 178, the twelve high order bits of which are provided by the mux 179 in the manner described above. Thus, when the control bit 170 indicates that the next node does not include a two-entry table, the mapping function produces a 16-bit output that is identical to the 16-bit address that is output from the embodiment of the present invention shown in FIG. 4. Thus, for LEVEL 1 the output 178 provides bits zero to fifteen of the search object, and for LEVEL2–LEVEL5 the output 178 provides a 12-bit arc address to a sixteen-entry table, as well as a 4-bit index from the relevant bits of the search object.

Referring to FIG. 8 mapping function 168 also includes a 4-bit comparator 182 which compares the four bits of the search object output from the mux 164 with the four bits 184 output from the register 166 (representing the value of the relevant bits of the non-miss entry stored in the two-entry table). The comparator 182 produces a 1-bit output 186 indicating whether the four bits of the search object match the relevant bits of the non-miss entry. When the control bit 170 indicates that the next nodes has only two entries, the mux 172 selects and passes the comparator output 186, along with the three intermediate offset address bits 188 output from the register 166. Thus, comparator output 186 provides a one-bit index into the two-entry table to select either the memory location indicating a match, or the location indicating a miss. Since only a one-bit index is used, the arc address that triggers the two-entry node provides fifteen bits of offset to address the RAM 160. This 15-bit offset is provided by the high order 12-bit offset 180 that is provided irrespective of the number of the entries for the table, as well as the three intermediate address bits 188 used only for two-entry tables. The three intermediate bits 188 are concatenated with the comparator output 186 to form four bits that pass through the mux 172 when control bit 170 indicates the use of a two-entry table. As stated above, this 4-bit output 176 of the mux 172 provides the low order address bits to the RAM 160.

As stated above, the mapping function 168 can be implemented in numerous other ways, using known logic design techniques. The specific implementation shown in FIG. 6 is provided merely for illustrative purposes because it is simple and facilitates understanding of the manner in which the mapping function enables the use of two-entry tables. The present invention is not limited to this specific implementation.

In addition to using two-entry tables in the manner described above, additional efficiency gains can be achieved by using other intermediate-sized tables. For example, the mapping function 168 can also be used to implement four and eight-entry tables, in addition to the two and sixteen-entry tables described above. To support this increased flexibility, additional control bits could be added to the width of the RAM 160. Thus, by following the principles described above in connection with the implementation of two-entry tables, and by using standard logic design techniques and additional control bits where necessary, the mapping function can also be made to implement four and eight-entry tables. For example, a simple way to implement the 4-bit compare of the mapping function when there are multiple non-miss table entries is to add sixteen (i.e., $2^4$) instruction bits to the RAM. Each instruction bit is assigned to one of the possible sixteen values that the four bits of the search object can represent, and only those values corresponding to non-miss entries are set to "1". Each of the instruction bits is sourced to a respective input of a sixteen-to-one demultiplexer, the select bits of which receive the four relevant bits of the search object. Thus, the demultiplexer output is a "1" only when the four compared bits of the search object match one of the non-miss entries so that the demultiplexer acts as a 4-bit comparator.

Figure 9C:
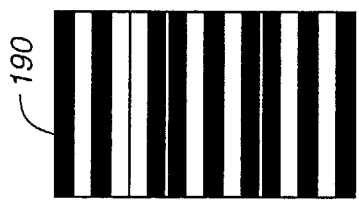
FIGS. 9(a)–9(c) illustrate the worst case memory efficiency for tables of various entry sizes.
Figure 9B:
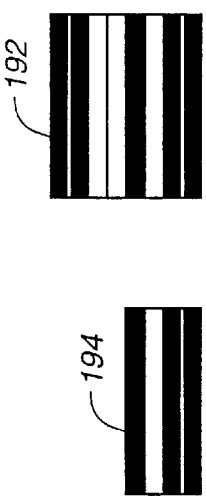
Figure 9A:
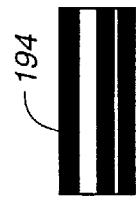

If sixteen, eight, four and two-entry tables are all used, the efficiency of the SMA device is increased. The most inefficient usage of four, eight and sixteen-entry tables for this implementation are respectively shown in FIGS. 9(a)–(c) wherein used locations are indicated by cross-hatching. As seen from FIG. 9(c), when eight-entry tables are used, the worst case usage for a sixteen-entry table 190 is a ratio of 7/9 unused to used locations. Similarly, FIG. 9(b) demonstrates that if four-entry tables are used, the worst case usage for an eight-entry table 192 is a ratio of 3/5 unused to used locations. Finally, FIG. 9(a) demonstrates that so long as two-entry tables are used, the worst case usage for a four-entry table 194 is 1/3 unused to used locations. As seen from FIGS. 9(a)–9(c), the most inefficient table when this range of table sizes is used is still the sixteen-entry table 190 which has an unused to used ratio of 7/9. However, this ratio is less than the worst case ratio when only two and sixteen-entry tables are used and thus, the use of two, four and eight-entry tables increases the efficiency of the SMA device, thereby decreasing the worst case amount of memory required to implement an SMA device that supports a given number of entries.

Figure 10:
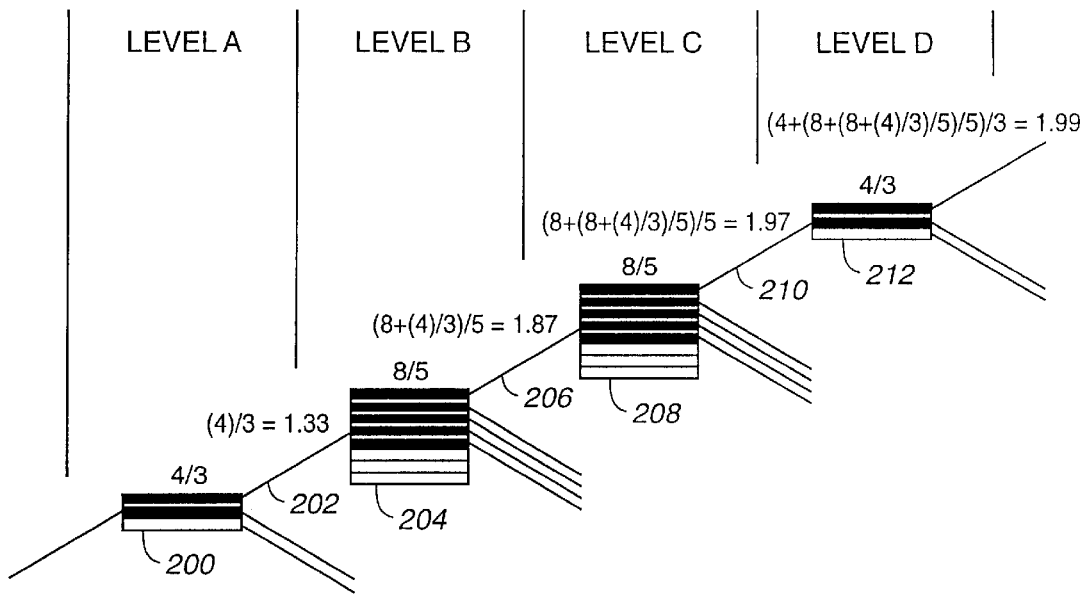
FIG. 10 demonstrates the manner in which the worst case number of memory locations per entry can be calculated for one implementation of the scattered memory access device.

FIG. 10 illustrates the manner in which the number of memory locations required per entry can be calculated for an SMA device having a mapping ability that supports two, four, eight and sixteen-entry tables. A block of four memory locations 200 at LEVELA is shown in a worst case configuration wherein only three locations are used. Thus, four memory locations are used to implement only three entries. Therefore, the cost per entry for implementing these three entries at LEVELA is 4/3 or 1.33 (i.e., one plus 1/3 allocated to the unused location). One of the three entries at LEVELA includes an arc address 202 to an eight-entry node 204 at LEVELB. The node 204 is a worst case eight-entry configuration wherein only five entries are used. The cost per entry for implementing node 204 at LEVELB is 8/5 or 1.6 (i.e., one plus 3/5 allocated to the unused locations). Additionally, each of the five entries at node 204 also requires the allocation of one memory location at node 200. However, this LEVELA memory location is shared by five entries. Thus, the cost per entry is (4/3)/5 for the LEVELA entry, plus 8/5 for LEVELB, equaling a total of 1.87.

One of the five entries at LEVELB includes an arc address 206 to an eight-entry node 208 at LEVELC. The node 208 is also a worst case eight-entry configuration wherein only five entries are used. The cost per entry for implementing node 208 is ((4/3)/5)/5 for LEVELA, plus (8/5)/5 for LEVELB, plus 8/5 for LEVELC, equaling a total of 1.97. One of the five entries at LEVELC includes an arc address 210 to a four-entry node 212 at LEVELD. The node 212 is a worst case four-entry configuration wherein only three entries are used. The cost per entry for implementing node 212 is (((4/3)/5)/5)/3 for LEVELA, plus ((8/5)/5)/3 for LEVELB, plus (8/5)/3 for LEVELC, plus 4/3 for LEVELD, equaling a total of 1.99.

As seen from the foregoing, the average number of memory locations required per entry to implement the SMA device increases with an increase in the number of bits of the entries stored therein. However, as demonstrated by the example shown in FIG. 10, so long as the worst case ratio of unused to used locations for each node in the device is less than one, the cost per entry will not exceed two. This property of the SMA device is proven below.

The cost per entry $X_{N+1}$ for a node at level N+1 is defined by the following recursive definition, wherein A indicates the number of entries in the node at level N+1, B indicates the number of non-miss entries at node N+1, and $X_N$ indicates the cost per entry at node N.

$$X_{N+1} = (A + X_N)/B$$

This formula can, by induction, be rewritten in non-recursive terms as follows:

$$X_{N+1} = 1/B \sum_{k=0}^{N} A(1/B)^k.$$

As described in Gradshteyn and Ryzhik, "Tables of Integrals, Series, and Products", Academic Press, 1965 (English translation), which is incorporated herein by reference, the following relation holds true:

$$\sum_{k=0}^{\infty} A(1/B)^k = A/(1 - 1/B), \text{ where } 1/B < 1.$$

Thus, $$X\infty = (1/B) \times (A/(1 - 1/B)), \text{ which reduces}$$

to:

$$X\infty = A/(B - 1).$$

As stated above, the most inefficient usage of memory in a system wherein two, four, eight and sixteen entry tables are used is for a sixteen entry table wherein only nine entries are used. For such an implementation, A equals sixteen and B equals nine. When these values are substituted into the formula provided above, it is seen that the worst case number of memory locations per entry, even for an SMA device having entries with an infinite number of bits, does not exceed two. This bounding of the number of memory locations used to the number of entries is significant because this is the most important factor in maintaining the memory usage at a reasonable level. Although the total amount of memory required to implement the SMA device is also dependent on the number of bits stored in each memory location, that number does not greatly increase as the number of supported entries grows. The addition of a single bit to the memory width doubles the number of addresses that can be generated by a group of address bits, or doubles the number of functions that can be performed by a mapping function, thereby providing significantly greater functional capability without significantly increasing the amount of memory required.

Although two, four and eight-entry tables have been specifically described as increasing the efficiency of the scattered memory access device, it should be understood that any table having fewer than sixteen entries, including tables having an odd number of entries, also provides similar results. The two, four and eight-entry tables have been used as examples merely for illustrative purposes. Additionally, as stated above, the SMA device of the present invention is not limited to comparing four bits at each level. Any number D of desired bits can be compared at a given level, so that the maximum size table at that level would be equal to $2^D$. Tables of any size less than $2^D$ can also be implemented at that level to increase the efficiency of the device in the manner described above.

The use of tables having fewer than $2^D$ entries at a level wherein D bits are compared adds somewhat to the complexity of the table management process. For the sake of illustration, reference is again made to FIG. 6. As shown in FIG. 6, a two-entry table 142 is used to represent node "2E386XXX" because the address "0" is the only non-miss arc emanating therefrom. Thus, when the entry "2E386077" was added to the SMA device of FIG. 6, the memory management scheme assigned only two memory locations to implement node 142. If two additional entries having addresses "2E386853" and "2E386212" were subsequently added to the SMA device of FIG. 6, node 142 would have to be expanded and could no longer be implemented as a two-entry table because three non-miss arcs (i.e., "2E3860XX", "2E3868XX" and "2E3862XX") would emanate therefrom. Thus, node 142 would need to be expanded from two memory locations to four memory locations, assuming that only two, four, eight and sixteen-entry tables were supported. Thus, when the two new entries were added, the table management scheme would need to relocate node 142 to a position in memory wherein four contiguous memory locations were available for use. In addition, the memory management scheme would then "delete" the entries at the two memory locations previously used by node 142 by indicating that those two memory locations were available for use. Although these additional memory requirements are somewhat more complicated, techniques capable of performing these tasks are well-known and in use in other applications.

The increased efficiency gained by using incremental table sizes more than offsets any increase in table management complexity. The use of smaller tables that incrementally subdivide the largest table size in half (e.g., for a maximum table size of sixteen, tables of eight, four, two and one entry are used) ensures that the worst case ratio of unused to used locations in any table is less than ½. As described above in connection with FIG. 10, this characteristic ensures that for any number of entries, the worst case number of memory locations required to implement the SMA device is less than twice the number of supported entries.

The efficiency of the scattered memory access device can be further increased through the use of a miss or fail table. Making reference to FIG. 6, it can be seen that each of the three two-entry tables 143–145 contained in LEVEL4 have one of their memory locations dedicated to indicating that a miss has occurred. The number of memory locations used to implement LEVEL4 could be reduced if each of the nodes 143–145 shared a common address for this purpose. If implemented in this manner, the mapping function 168 sources to the RAM 160 the same memory address whenever a miss is detected from either of nodes "2E384BXX", "2E3860XX", or "2E38E0XX". Thus, a fail table can be implemented to provide addresses indicating various types of misses. The use of a fail table to represent multiple misses enables the two-entry tables illustrated in FIG. 6 to be reduced to a single non-miss entry. Thus, except for the memory locations used to implement the miss or fail table, the number of memory locations-used to implement a node having a single entry is reduced in half from two to one.

The number of entries in the fail table can be varied depending upon the application, and upon whether various useful information is desired when a fail occurs. As explained above, the searching technique of the present invention is useful for implementing weighted searches wherein when a miss occurs, it is desirable to know whether a given number of bits matched any entry in the search table. In a system wherein weighted searching is desirable, the fail table can be implemented with a plurality of locations, at least one location corresponding to each of the levels. In this manner, each miss that references the fail table from LEVEL1 can be mapped by the mapping function 168 to a first miss table address, each miss that occurs at LEVEL2 can be mapped to a second miss table address, and so on. As a result, the various miss table locations contain information regarding the number of bits that matched prior to determining a mismatch. However, for an application wherein each miss is treated in the same manner, such that no additional information is to be gained when a miss occurs, the fail table can be implemented as a single memory location so that each miss can be mapped to the same failure address. If implemented in this manner, less memory locations are required to implement the fail table.

Although the fail table is specifically described above as being used to reduce the size of two-entry tables, it can also be used to decrease the size of other tables as well. The fail table enables the savings of one entry for each node because tables of non-miss entries need not dedicate a memory location to indicate a miss. To achieve this savings, sufficient instruction bits can be added to the memory width to control the mapping function so that when a miss occurs, the memory address is mapped to the fail table.

The number of locations in the RAMs 160 (FIG. 7) and 106 (FIG. 4) can be further reduced by eliminating the previously-assumed restriction that each of LEVEL1–LEVEL5 be assigned a separate page of memory. This restriction was assumed previously for the sake of clarity and simplicity in explaining how the embodiment of the present invention shown in FIG. 3 can be converted to use a single RAM. However, it is not necessary that each level be assigned a separate page. Rather, the memory can be used most efficiently by simply allowing the table management scheme to assign memory locations on an as needed basis. There is no reason why each of the memory locations used to implement a given level need to be contiguous in memory. Thus, the memory can be organized in any conceivable fashion to maximize efficiency of use.

Figure 11:
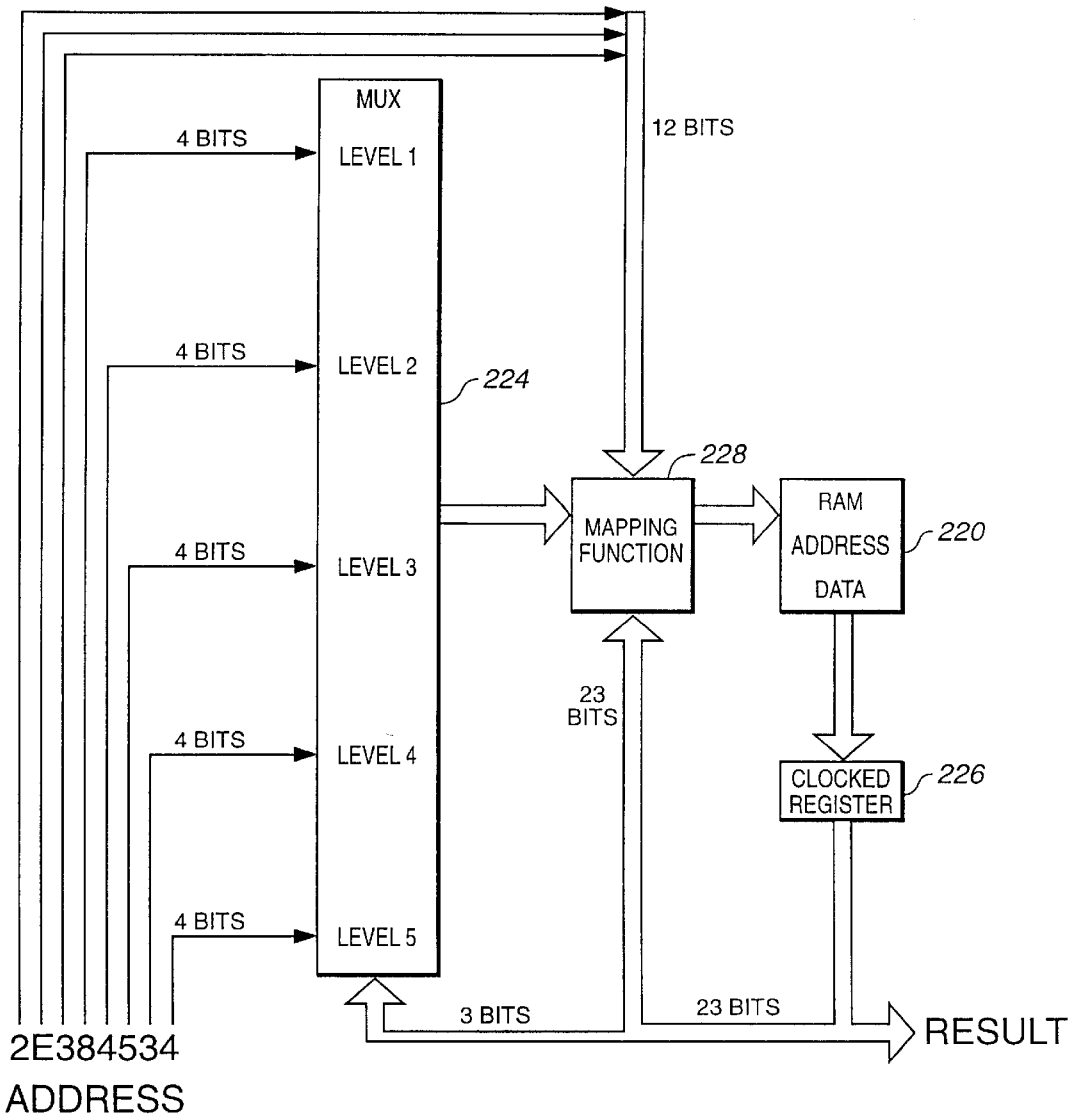
FIG. 11 is a block diagram of a fourth embodiment of the scattered memory access device wherein the source of the memory address for a given node is determined by instruction bits from the preceding node.

FIG. 11 illustrates an alternate embodiment of the SMA device of the present invention wherein a single RAM 220 is implemented in the above-described manner without having separate pages of memory assigned to each of the levels. Like the embodiment shown in FIG. 7, the embodiment shown in FIG. 11 includes a RAM 220, a clocked register 226, a 4-bit mux 224 and a mapping function 228. However, the FIG. 11 embodiment does not include a counter for selecting among the inputs to the mux 224 based upon which level of the search is being performed. Rather, three instruction bits are added to the width of the RAM 220 and are sourced to the select inputs of the mux 224. In this manner, the memory locations at each node include instruction bits that select the source of the address to the RAM 220 for the succeeding cycle.

Figure 12:
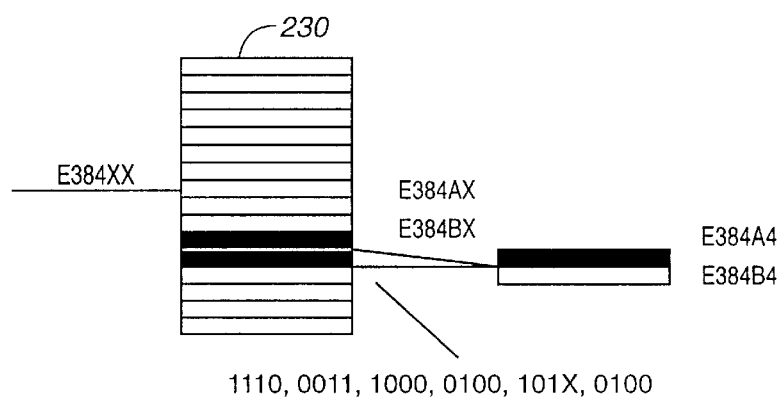
FIG. 12 demonstrates the manner in which Don't Cares are implemented by the scattered memory access device.

The scattered memory access device of the present invention has been illustratively described above as implementing searches wherein the number of bits of interest in the search object matches the number of bits of interest for each entry in the device. However, the SMA device can also perform searches wherein the number of bits of interest do not exactly coincide. For example, Don't Cares are easily implemented by the SMA device by having more than one entry at given node generate the same arc address for a succeeding node. The implementation of Don't Cares is shown in FIG. 12 wherein a twenty-four bit value is stored in a sixteen-entry node 230 of the SMA device and has a binary value "1110 0011 1000 0100 101x 0100", the letter "x" representing a Don't Care. Thus, this entry represents two 24-bit values, i.e., "E384A4" and "E384B4". As shown in FIG. 12, this Don't Care is easily implemented by the SMA device by having both memory locations "A" and "B" in node 230 map to the same node address at the subsequent level. This capability enables the scattered memory access device to implement searches wherein the number of bits of interest in the search object and the device entries are not identical.

It should be understood that various changes and modifications of the embodiments shown in the drawings may be made within the scope of this invention. Thus, it is intended that all matter contained in the above description and shown in the accompanying drawings be interpreted in an illustrative an not limiting sense.

I claim:

1. An apparatus for determining whether a search object matches any entry in a knowledge base comprising:

a plurality of nodes, each node corresponding to a partial match for an entry in the knowledge base; and a plurality of arcs connecting the nodes, each arc forming a submap which indicates a subset of nodes which correspond to entries in the knowledge base that include the partial match from the previous node, the plurality of nodes and arcs forming a neural network such that the apparatus determines whether the search object matches an entry in the knowledge base by dividing the search object into a plurality of search object bits, using a first group of search object bits to access a first node, the first node including a first submap which is used with a subsequent group of search object bits to access a subsequent node having a subsequent submap, and thereby repeating the search until all the groups of search object bits have been searched and a last submap accessed indicates that the search object either matches or does not match an entry in the knowledge base.

2. The apparatus as defined in claim 1 wherein the nodes are memory locations in a memory and the submaps are the contents of the memory location.

3. The apparatus as defined in claim 2 wherein the submap is appended to the subsequent group of search object bits to create an address to the subsequent location in the memory, which address is dependent on all prior groups of search object bits.

4. The apparatus as defined in claim 2 wherein the contents of the memory location accessed indicate a miss or a match according to a value of the contents, such that a zero value indicates a miss and a non-zero value provides the submap which is dependent on the groups of search object bits utilized.

5. The apparatus as defined in claim 1 wherein the plurality of groups of search object bits comprises five groups of search object bits.

6. An apparatus for determining whether a search object matches any entry in a knowledge base comprising:

means for selecting at least one search object bit;

means for determining whether the at least one search object bit matches a corresponding at least one bit in any entry in the knowledge base by accessing a memory location associated with the at least one search object bit, the memory location storing a submap corresponding to a subset of entries in the knowledge base which match the at least one search object bit;

means for selecting at least one subsequent search object bit such that the submap and the at least one subsequent search object bit are used to determine if the at least one subsequent search object bit matches a subsequent corresponding at least one bit in any entry in the subset of entries in the knowledge base by accessing a subsequent memory location associated with the submap and the at least one subsequent search object bit, the subsequent memory location storing a subsequent submap; and means for repeating steps (c) and (d) using each subsequent group of search object bits and each subsequent submap until all the bits of the search object have been searched.

7. The apparatus as defined in claim 6 further comprising means for determining whether the search object matches any entry in the knowledge base based on the submap stored in the last memory location accessed.

8. The apparatus as defined in claim 6 wherein searching is terminated whenever one of the submaps indicates there is no matching entry in the knowledge base.

9. The apparatus as defined in claim 6 wherein each submap corresponds to a subset of entries in the knowledge base which have the associated group of search object bits and each subsequent group of search object bits.

10. An apparatus for determining whether a search object matches any entry in a knowledge base comprising:

a memory having a plurality of memory locations, each memory location containing a submap associated with that memory location, the memory locations and the submaps forming a neural network, wherein the memory locations are accessed by a portion of the search object, or by subsequent portions of the search object in conjunction with a submap from the previous memory location accessed, and wherein the apparatus determines whether the search object matches an entry in the knowledge base by the value of the last submap.

11. The apparatus as defined in claim 10 wherein searching is terminated whenever one of the submaps indicates there is no matching entry in the knowledge base.

12. The apparatus as defined in claim 10 wherein each submap indicates whether the associated group of bits correspond to a single match or multiple matches.

13. An apparatus which aids in searching a knowledge base to determine if an entry in the knowledge base matches a search object comprising:

a memory having a plurality of memory locations such that a group of bits from an entry in the knowledge base corresponds to at least a partial address for a particular memory location;

a submap in each memory location which has a value indicating either a subsequent group of submaps that match the portion of the search object searched thus far, or the submap indicating that a search object matches the entry in the knowledge base, wherein the structure of the memory and submaps forms a neural network.

14. The apparatus as defined in claim 13 wherein each submap indicates whether the associated group of bits correspond to a single match or to multiple matches.

* * * * *